(12) United States Patent
Xue et al.

(10) Patent No.: US 11,722,993 B2
(45) Date of Patent: Aug. 8, 2023

(54) TECHNIQUES FOR CONFIGURING RESOURCES IN A SIDELINK RESOURCE POOL

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/209,928

(22) Filed: Mar. 23, 2021

(65) Prior Publication Data

US 2022/0312378 A1 Sep. 29, 2022

(51) Int. Cl.
*H04W 56/00* (2009.01)
*H04W 72/02* (2009.01)
*H04W 76/27* (2018.01)
*H04L 27/26* (2006.01)
*H04W 72/0446* (2023.01)
*H04W 72/0453* (2023.01)
*H04L 1/1812* (2023.01)
*H04W 72/30* (2023.01)
*H04W 72/53* (2023.01)

(52) U.S. Cl.
CPC .......... *H04W 72/02* (2013.01); *H04L 1/1819* (2013.01); *H04L 27/2607* (2013.01); *H04W 72/0446* (2013.01); *H04W 72/0453* (2013.01); *H04W 72/30* (2023.01); *H04W 72/53* (2023.01); *H04W 76/27* (2018.02)

(58) Field of Classification Search
CPC ... H04W 72/02; H04W 76/27; H04W 72/005; H04W 72/0446; H04W 72/0453; H04W 72/0493; H04L 1/1819; H04L 27/2607
USPC .......................................................... 370/329
See application file for complete search history.

(56) References Cited

U.S. PATENT DOCUMENTS

| | | | |
|---|---|---|---|
| 2020/0146044 A1* | 5/2020 | Maaref | H04W 72/14 |
| 2020/0288435 A1 | 9/2020 | Kwak et al. | |
| 2020/0289435 A1* | 9/2020 | Twomey | A61L 15/44 |
| 2021/0203429 A1* | 7/2021 | Lin | H04L 5/0053 |
| 2021/0289380 A1* | 9/2021 | Chae | H04W 24/10 |
| 2022/0039082 A1 | 2/2022 | Belleschi et al. | |
| 2022/0110105 A1* | 4/2022 | Belleschi | H04W 76/14 |
| 2022/0140956 A1* | 5/2022 | Park | H04L 1/1812 |
| | | | 370/329 |

* cited by examiner

*Primary Examiner* — Sai Ming Chan
(74) *Attorney, Agent, or Firm* — Dalei Dong; Holland & Hart LLP

(57) ABSTRACT

Methods, systems, and devices for wireless communications are described. A first user equipment (UE) may transmit, to a device, a request to transmit a sidelink message to a second UE. The first UE may receive, from the device and in response to the transmitted request, an indication of one or more configured sidelink resources allocated to the first UE. The configured sidelink resources may be allocated to the first UE from a pool of sidelink resources configured for a sensing-based channel access procedure. The UE may transmit the sidelink message to the second UE on at least one of the configured sidelink resources associated with the received indication.

28 Claims, 18 Drawing Sheets

TECHNIQUES FOR CONFIGURING RESOURCES IN A SIDELINK RESOURCE POOL

FIELD OF DISCLOSURE

The following relates to wireless communications, including techniques for configuring resources in a sidelink resource pool.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, multiple UEs may communicate directly with each other via sidelink communications (e.g., without messages being transmitted through a base station). Techniques are desired for enhancing sidelink communications.

SUMMARY

The described techniques provide for a communication device to support assigning individual resources of a resource pool configured for a second channel access mode (e.g., a mode that includes a sensing-based channel access procedure) to specific user equipments (UEs) in a sidelink cluster. In some cases, a first UE may send a request to a base station (or an anchor/master UE) for transmission over sidelink. Subsequently, the base station may configure the first UE to operate according to an enhanced channel access mode. For example, the base station may configure the first UE with one or more sidelink resources within a resource pool configured for the second channel access mode, such that the first UE may access the one or more sidelink resources without performing a sensing procedure (e.g., a sensing-based channel access procedure). In some examples, the base station may configure the first UE with the one or more sidelink resources (e.g., preconfigured resources) via radio resource control (RRC) signaling, a downlink control information (DCI) message, or both. In some cases, the first UE may use the configured resources (e.g., without sensing) for sidelink hybrid automatic repeat request (HARD) transmissions.

In some examples, synchronization UE(s) (e.g., chosen by the base station) may also receive information on additional configured resources (e.g., configured to additional UEs in the sidelink cluster), and the synchronization UE(s) may then broadcast an indication of the additional configured resources to other UEs in the sidelink cluster (e.g., over an extended sidelink broadcast channel). Additionally or alternatively, the base station may broadcast (e.g., via a system information block (SIB)) an indication of the configured resources for each UE to the UEs in the sidelink cluster. The described techniques may thereby promote increased spectral and power efficiencies by using an enhanced version of the second channel access mode.

A method for wireless communications at a first UE is described. The method may include transmitting, to a device, a request to transmit one or more sidelink messages to a second UE; receiving, from the device and based on the transmitted request, an indication of one or more configured sidelink resources allocated to the first UE, the one or more configured sidelink resources being allocated to the first UE from a pool of sidelink resources configured for a sensing-based channel access procedure; and transmitting, to the second UE on at least one of the one or more configured sidelink resources, the sidelink message based on the received indication.

An apparatus for wireless communications at a first UE is described. The apparatus may include a processor, memory coupled with the processor, and instructions stored in the memory. The instructions may be executable by the processor to cause the apparatus to transmit, to a device, a request to transmit one or more sidelink messages to a second UE; to receive, from the device and based on the transmitted request, an indication of one or more configured sidelink resources allocated to the first UE, the one or more configured sidelink resources being allocated to the first UE from a pool of sidelink resources configured for a sensing-based channel access procedure; and to transmit, to the second UE on at least one of the one or more configured sidelink resources, the sidelink message based on the received indication.

Another apparatus for wireless communications at a first UE is described. The apparatus may include means for transmitting, to a device, a request to transmit one or more sidelink messages to a second UE; means for receiving, from the device and based on the transmitted request, an indication of one or more configured sidelink resources allocated to the first UE, the one or more configured sidelink resources being allocated to the first UE from a pool of sidelink resources configured for a sensing-based channel access procedure; and means for transmitting, to the second UE on at least one of the one or more configured sidelink resources, the sidelink message based on the received indication.

A non-transitory computer-readable medium storing code for wireless communications at a first UE is described. The code may include instructions executable by a processor to transmit, to a device, a request to transmit one or more sidelink messages to a second UE; to receive, from the device and based on the transmitted request, an indication of one or more configured sidelink resources allocated to the first UE, the one or more configured sidelink resources being allocated to the first UE from a pool of sidelink resources configured for a sensing-based channel access procedure; and to transmit, to the second UE on at least one of the one or more configured sidelink resources, the sidelink message based on the received indication.

In some examples of the method, apparatuses, and non-transitory computer-readable medium described herein, receiving the indication of the one or more configured sidelink resources allocated to the first UE may include operations, features, means, or instructions for receiving the indication via RRC signaling, a DCI message, or both.

In some examples of the method, apparatuses, and non-transitory computer-readable medium described herein, transmitting the sidelink message may include operations, features, means, or instructions for transmitting, to the second UE, one or more HARQ transmissions on the at least one of the one or more configured sidelink resources.

Some examples of the method, apparatuses, and non-transitory computer-readable medium described herein may further include operations, features, means, or instructions for transmitting, to the second UE, an initial HARQ transmission on the at least one of the one or more configured sidelink resources; and transmitting, to the second UE, one or more HARQ retransmissions based on transmitting a second request to the base station, performing the sensing-based channel access procedure, or a combination thereof.

In some examples of the method, apparatuses, and non-transitory computer-readable medium described herein, the one or more HARQ transmissions may include an initial HARQ transmission, one or more HARQ retransmissions, or a combination thereof.

Some examples of the method, apparatuses, and non-transitory computer-readable medium described herein may further include operations, features, means, or instructions for receiving, from the device, an additional indication of one or more additional configured sidelink resources allocated to one or more additional UEs, the one or more additional configured sidelink resources being allocated to the one or more additional UEs from the pool of sidelink resources configured for the sensing-based channel access procedure.

Some examples of the method, apparatuses, and non-transitory computer-readable medium described herein may further include operations, features, means, or instructions for transmitting the additional indication of the one or more additional configured sidelink resources via a sidelink broadcast channel message.

In some examples of the method, apparatuses, and non-transitory computer-readable medium described herein, transmitting the additional indication via the sidelink broadcast channel may include operations, features, means, or instructions for transmitting the additional indication of the one or more additional configured sidelink resources via a sidelink remaining system information message that may be frequency division multiplexed (FDMed) with the sidelink broadcast channel message.

In some examples of the method, apparatuses, and non-transitory computer-readable medium described herein, receiving the additional indication of the one or more additional configured sidelink resources may include operations, features, means, or instructions for receiving the additional indication from the base station via a broadcast message.

Some examples of the method, apparatuses, and non-transitory computer-readable medium described herein may further include operations, features, means, or instructions for transmitting, on a first configured sidelink resource of the one or more configured sidelink resources allocated to the first UE, an additional indication corresponding to one or more subsequent configured sidelink resources of the one or more configured sidelink resources after the first configured sidelink resource, where the one or more subsequent configured sidelink resources are available to be used by an additional UE.

In some examples of the method, apparatuses, and non-transitory computer-readable medium described herein, the additional indication corresponding to the one or more subsequent configured sidelink resources may include a single subsequent configured sidelink resource, a set of subsequent configured sidelink resources defined by a time-frequency window, a set of subsequent configured sidelink resources with a specified periodicity, or a combination thereof.

In some examples of the method, apparatuses, and non-transitory computer-readable medium described herein, transmitting the sidelink message may include operations, features, means, or instructions for transmitting the sidelink message on the at least one of the one or more configured sidelink resources with a non-zero cyclic prefix (CP) extension.

In some examples of the method, apparatuses, and non-transitory computer-readable medium described herein, the one or more configured sidelink resources include sidelink resources with a non-zero CP extension, sidelink resources with a zero CP extension, sidelink resources indicated by a sidelink broadcast channel, or a combination thereof.

Some examples of the method, apparatuses, and non-transitory computer-readable medium described herein may further include operations, features, means, or instructions for transmitting, to the device, one or more periodical reports, where the one or more configured sidelink resources are based on the one or more periodical reports.

Some examples of the method, apparatuses, and non-transitory computer-readable medium described herein may further include operations, features, means, or instructions for releasing the one or more configured sidelink resources based on a configured release counter.

Some examples of the method, apparatuses, and non-transitory computer-readable medium described herein may further include operations, features, means, or instructions for receiving, from the device, a reception configuration including an additional indication of one or more time instances for operating in a receiving mode for sidelink communications with an additional device.

In some examples of the method, apparatuses, and non-transitory computer-readable medium described herein, transmitting the request to transmit the one or more sidelink messages may include operations, features, means, or instructions for transmitting the request including a request for one or more sidelink resources for transmitting the sidelink message.

In some examples of the method, apparatuses, and non-transitory computer-readable medium described herein, transmitting the one or more sidelink message may include operations, features, means, or instructions for transmitting the sidelink message on the at least one of the one or more configured sidelink independent of performing the sensing-based channel access procedure.

A method for wireless communications at a device is described. The method may include receiving, from a first UE, a request for the first UE to transmit one or more sidelink messages to a second UE; and transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

An apparatus for wireless communications at a device is described. The apparatus may include a processor, memory coupled with the processor, and instructions stored in the memory. The instructions may be executable by the processor to cause the apparatus to receive, from a first UE, a request for the first UE to transmit one or more sidelink messages to a second UE; and to transmit, to the first UE and based on the received request, an indication of one or more configured sidelink resources allocated to the first UE, the one or more configured sidelink resources being allocated to the first UE from a pool of sidelink resources configured for a sensing-based channel access procedure.

Another apparatus for wireless communications at a device is described. The apparatus may include means for receiving, from a first UE, a request for the first UE to transmit one or more sidelink messages to a second UE; and means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

A non-transitory computer-readable medium storing code for wireless communications at a device is described. The code may include instructions executable by a processor to receive, from a first UE, a request for the first UE to transmit one or more sidelink messages to a second UE; and to transmit, to the first UE and based on the received request, an indication of one or more configured sidelink resources allocated to the first UE, the one or more configured sidelink resources being allocated to the first UE from a pool of sidelink resources configured for a sensing-based channel access procedure.

In some examples of the method, apparatuses, and non-transitory computer-readable medium described herein, transmitting the indication of the one or more configured sidelink resources allocated to the first UE may include operations, features, means, or instructions for transmitting the indication via RRC signaling, a DCI message, or both.

Some examples of the method, apparatuses, and non-transitory computer-readable medium described herein may further include operations, features, means, or instructions for transmitting, to the first UE, an additional indication of one or more additional configured sidelink resources allocated to one or more additional UEs, the one or more additional configured sidelink resources being allocated to the one or more additional UEs from the pool of sidelink resources configured for the sensing-based channel access procedure.

In some examples of the method, apparatuses, and non-transitory computer-readable medium described herein, transmitting the additional indication of the one or more additional configured sidelink resources may include operations, features, means, or instructions for transmitting the additional indication to a set of multiple UEs via a broadcast message, the set of multiple UEs including the first UE and the second UE.

In some examples of the method, apparatuses, and non-transitory computer-readable medium described herein, the one or more configured sidelink resources may include sidelink resources with a non-zero CP extension, sidelink resources with a zero CP extension, sidelink resources indicated by a sidelink broadcast channel, or a combination thereof.

Some examples of the method, apparatuses, and non-transitory computer-readable medium described herein may further include operations, features, means, or instructions for receiving, from the first UE, one or more periodical reports, where the one or more configured sidelink resources are based on the one or more periodical reports.

Some examples of the method, apparatuses, and non-transitory computer-readable medium described herein may further include operations, features, means, or instructions for transmitting, to the first UE, an additional indication of a release counter, where the first UE releases the one or more configured sidelink resources based on the release counter.

Some examples of the method, apparatuses, and non-transitory computer-readable medium described herein may further include operations, features, means, or instructions for transmitting, to the first UE or the second UE or both, a reception configuration including an additional indication of one or more time instances for operating in a receiving mode for sidelink communications with an additional device.

In some examples of the method, apparatuses, and non-transitory computer-readable medium described herein, receiving the request for the first UE to transmit the one or more sidelink messages may include operations, features, means, or instructions for receiving the request including a request for one or more sidelink resources for transmitting the sidelink message.

DETAILED DESCRIPTION

Figure 1:
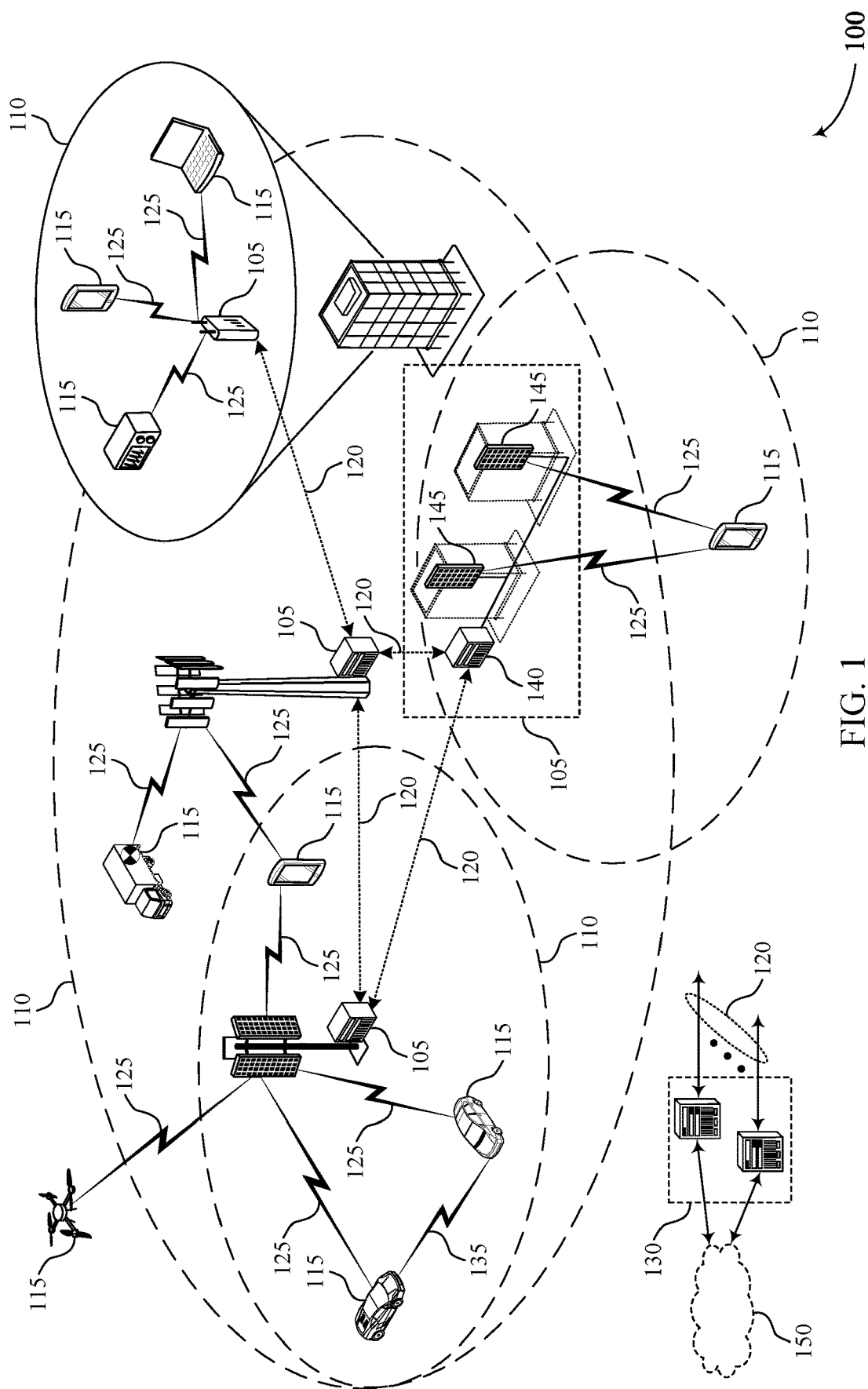
FIG. 1 illustrates an example of a wireless communications system that supports techniques for configuring resources in a sidelink resource pool in accordance with various aspects of the present disclosure.

In some wireless communications systems, user equipments (UEs) may perform sidelink communications over available time and frequency resources of a sidelink channel to communicate directly with each other. In some cases, prior to a UE (also referred to herein as a first UE or a transmitting UE) transmitting a sidelink data transmission to another UE (also referred to herein as a second UE or a receiving UE), the first UE may identify whether resources are available for the sidelink data transmission. For example, the first UE may identify and avoid transmitting over resources which are already in use, or reserved, by other UEs.

Additionally, a wireless communication system may also include a base station, which may provide wireless communication services to one or more UEs including configurations or information to enable sidelink communications. In some cases, the sidelink communications may be deployed using different channel access modes (e.g., a Mode 1, a Mode 2, etc.). For example, a first channel access mode (e.g., Mode 1) may be used for deployment within a coverage area of a base station, where the base station allocates specific resources (e.g., orthogonal resources) to UEs for the sidelink communications. Additionally or alternatively, a second channel access mode (e.g., Mode 2) may be used for autonomous deployments, where a pool of shared or common resources are configured for the sidelink communications, and a UE may attempt to reserve one or more resources of the pool of resources based on a sensing process (e.g., sensing if on-going transmissions are occurring on the resources or not, such as sensing if a power measurement is above or satisfies a threshold value). In some cases, the sensing process (e.g., based on random access) may compromise power efficiency. Additionally, a cluster of UEs performing sidelink communications (e.g., a sidelink cluster) may have poor or weak network control due to poor coverage, downlink channel capacity may be impacted when managing a large number of sidelink links, or both. Further, sidelink UEs may be battery powered, where both the first channel access mode and the second channel access mode may unnecessarily expend the battery power.

Various aspects of the present disclosure relate to assigning individual resources of a resource pool configured for the second channel access mode to specific UEs in a sidelink cluster. In some cases, a first UE may send a request to a base station (or an anchor/master UE) for transmission over sidelink. Subsequently, the base station may configure the first UE to operate according to an enhanced version of the second channel access mode. For example, the base station may configure the first UE with one or more sidelink resources within the resource pool configured for the second channel access mode, such that the first UE may access the one or more sidelink resources without performing a sensing process associated with the second channel access mode. In some examples, the base station may configure the first UE with the one or more sidelink resources (e.g., preconfigured resources) via radio resource control (RRC) signaling, a downlink control information (DCI) message, or both. In some cases, the first UE may use the configured resources (e.g., without sensing) for sidelink hybrid automatic repeat request (HARD) transmissions. In some examples, synchronization UE(s) (e.g., chosen by the base station) may also receive information on additional configured resources (to additional UEs in the sidelink cluster) and may broadcast an indication of the additional configured resources to the other UEs in the sidelink cluster (e.g., over an extended sidelink broadcast channel). Additionally or alternatively, the base station may broadcast (e.g., via a system information block (SIB)) an indication of the configured resources for each UE to the UEs in the sidelink cluster.

In some cases, the first UE (e.g., or an additional UE) may indicate resource skipping to the other UEs in the sidelink cluster (e.g., temporally releasing a configured resource for the first UE for opportunistic reuse by other sidelink UEs). In some cases, the first UE may be configured to use a non-zero cyclic prefix (CP) extension when transmitting on the configured sidelink resources. The configured sidelink resources may include different types, such as resources with non-zero CPs, resources without CPs, resources indicated via a broadcast message, or a combination thereof, and the type of resource may change between the different types. Additionally, the first UE may be configured to send the base station periodic reports (e.g., including a channel busy ratio (CBR) estimate, a skipping ration, a buffer status report (BSR), a listen-before-talk (LBT) failure, among other elements), where the periodic reports may affect or determine the one or more configured sidelink resources for the first UE. In some cases, the first UE (e.g., or an additional UE in the sidelink cluster) may receive a receiving configuration indicating time instances (e.g., sets of slots) where the first UE operates in a receiving mode. In some cases, in the absence of a base station, an anchor sidelink UE (e.g., a master sidelink UE) may establish the resource pool for the second channel access mode, may grant itself and/or additional UEs preconfigured resources from the resource pool, and may broadcast an indication of the preconfigured resources to other UEs.

Aspects of the disclosure are initially described in the context of a wireless communications system. Additional aspects of the disclosure are illustrated through additional wireless communications systems, resource pool configurations, a timeline, and a process flow. Aspects of the disclosure are further illustrated by and described with reference to apparatus diagrams, system diagrams, and flowcharts that relate to techniques for configuring resources in a sidelink resource pool.

FIG. 1 illustrates an example of a wireless communications system 100 that supports techniques for configuring resources in a sidelink resource pool in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical)

communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a first UE 115 may identify data for transmission to a second UE 115 over a sidelink channel. The first UE 115 may monitor for sidelink messages among multiple UEs 115 (e.g., the second UE 115, a third UE 115, and a fourth UE 115). In some aspects, the first UE 115 may monitor for sidelink messages over a transmit beam selected for transmitting the identified data to the second UE 115. The first UE 115 may monitor for sidelink messages during a sensing window. The sensing window may include time and frequency resources associated with transmitting or receiving sidelink messages. For example, the time and frequency resources may be reserved (e.g., based on a time of reservation or priority) for sidelink communications between sidelink enabled UEs 115.

In some wireless communications systems, sidelink communications may be used for delivering sparse (e.g., sporadic) safety related messages. The sidelink communications may be deployed using various channel access modes (e.g., a Mode 1, a Mode 2, etc.). For example, a first channel access mode (e.g., Mode 1) may be used for deployment within a coverage area of a base station 105 where the base station 105 may allocate specific resources to UEs 115 for the sidelink communications. In some cases, using the first channel access mode, each sidelink transmitting device may request a sidelink resource from a base station 105 (e.g., a gNB), and the base station 105 may allocate orthogonal resources to a corresponding sidelink transmitting device via a dynamic grant (DG) (e.g., over Layer 1 (L1)) or via a configured grant (CG) (e.g., over Layer 3 (L3) and L1). In some cases, this centralized resource allocation may facilitate high spectral efficiency but may also include a large signaling overhead. For example, CG sidelink may be supported by techniques that may still use DG-based retransmissions, such that multiple grants may be transmitted to support communication of a single sidelink message. In some cases, a second channel access mode (e.g., Mode 2) may be used for autonomous deployments where a pool of resources (e.g., shared or common resources) are configured for sidelink communications, and a UE 115 may attempt to reserve one or more resources of the pool of resources based on a sensing process (e.g., sensing if on-going transmissions are occurring on the resources or not, such as sensing if a power measurement is above a threshold value).

In some cases, as part of the second channel access mode, sidelink transmitting devices (e.g., transmitting UEs 115) may use sidelink control information (SCI) messages to reserve resources for future channel access. For example, each sidelink transmitting device may conduct sensing to be aware of any reservations in the resource pool (e.g., resources in the resource pool already reserved by other UEs 115) and may randomly (e.g., to increase chances of avoiding collisions) choose one or more available resources (e.g., resources that have not been reserved by other UEs 115). In some cases, orthogonal channel access may be achieved for the second channel access mode in systems with low to moderate system loading levels. Thus, spectral efficiency may be compromised using the second channel access mode when system loading levels increase. Additionally, sensing-based random access for the resource pool configured for the second channel access mode may also lead to compromised power efficiency. For example, a sidelink transmitting device may run long-term sensing to be aware of all related reservations, while a sidelink receiving device may need to monitor all resources to receive the data, thereby impacting the power efficiency at both the sidelink transmitting device and the sidelink receiving device based on the extended sensing and continuous monitoring.

In some examples, sidelink communications may be used in vertical domains that may have significantly different traffic than that in V2X communications. Vertical domains may include a respective industry or a group of enterprises in which similar products or services are developed, produced, and provided. For example, some vertical domains may carry enhanced mobile broadband (eMBB) communications (e.g., with relatively long bursts of data), where a spectral efficiency may need to be guaranteed to avoid system congestion and blocking. In some cases, downlink channel capacity (e.g., physical downlink control channel (PDCCH) capacity) may be impacted when managing a large number of sidelink links. Further, the network topology of some vertical domains may be less dynamic than that in V2X communications. That is, some vertical domains may use more sophisticated radio resource management (RRM) solutions based on long-term statistics and for long term sidelink links.

In some cases, a vertical domain may not have a licensed spectrum allocated to communications for that vertical domain, or a vertical domain that does have an allocated licensed spectrum may seek to perform sidelink communications over an unlicensed spectrum (e.g., for a more economical and wider data pipe and to facilitate more diverse use cases). For example, there may be a portion of available resources that can be used for sidelink communications in an unlicensed band (e.g., at least a 1.8 GHz bandwidth may be available in an unlicensed spectrum configured for operations between 5 and 6 GHz). This portion of available resources in the unlicensed band may be significantly larger than that of a resources available in a licensed band (e.g., approximately 100 MHz). In some cases, listen-before-talk (LBT) may be imposed for communications in the unlicensed band for co-existence among multiple radio access technologies (RATs). LBT may be a technique used to facilitate time-division multiplexing (TDM) multiple access within a small group of competing nodes, which may benefit the deployment of NR sidelink over unlicensed band.

Various aspects of the present disclosure relate to assigning individual resources of a resource pool configured for the second channel access mode to specific UEs 115 in a sidelink cluster. In some cases, a first UE 115 may send a request to a base station 105 (or an anchor/master UE 115) for transmission over sidelink. Subsequently, the base station 105 may configure the first UE 115 to operate according to an enhanced version of the second channel access mode. For example, the base station 105 may configure the first UE 115 with one or more sidelink resources within the resource pool configured for the second channel access mode, such that the first UE 115 may access the one or more sidelink resources without performing a sensing process. In some examples, the base station 105 may configure the first UE 115 with the one or more sidelink resources (e.g., preconfigured resources) via RRC signaling, a DCI message, or both. In some cases, the first UE 115 may use the configured resources (e.g., without sensing) for sidelink HARQ transmissions. In some examples, synchronization UE(s) 115 (e.g., chosen by the base station 105) may also receive information on additional configured resources (to additional UEs 115 in the sidelink cluster) and may broadcast an indication of the additional configured resources to the other UEs 115 in the sidelink cluster (e.g., over an extended sidelink broadcast channel). Additionally or alternatively, the base station 105 may broadcast (e.g., via a SIB) an indication of the configured resources for each UE 115 to the UEs 115 in the sidelink cluster.

Figure 2:
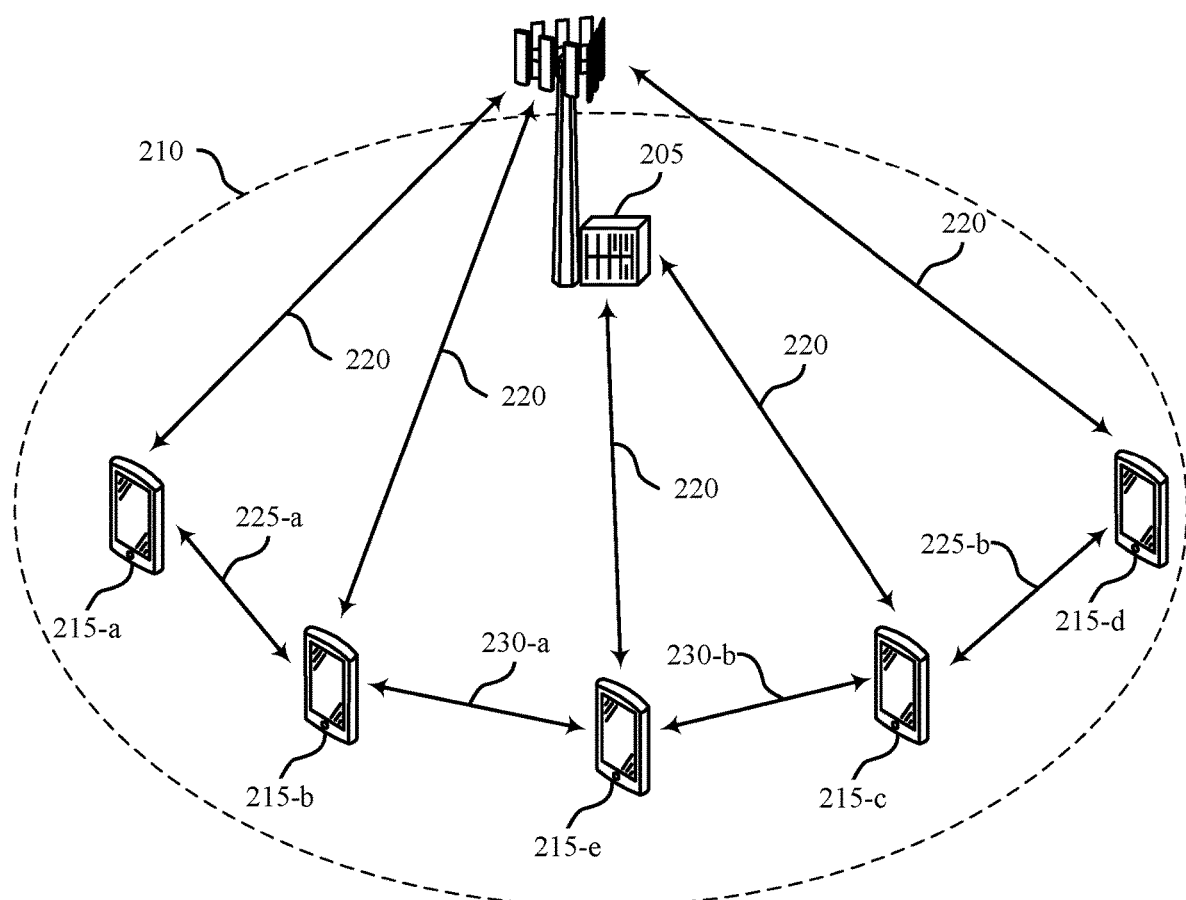
FIG. 2 illustrates an example of a wireless communications system that supports techniques for configuring resources in a sidelink resource pool in accordance with various aspects of the present disclosure.

FIG. 2 illustrates an example of a wireless communications system 200 that supports techniques for configuring resources in a sidelink resource pool in accordance with various aspects of the present disclosure. In some examples, the wireless communications system 200 may implement aspects of the wireless communications system 100 or may be implemented by aspects of the wireless communications system 100. For example, the wireless communications system 200 may include a base station 205 with a corresponding geographic coverage area 210 and one or more UEs 215, such as a first UE 215-a, a second UE 215-b, a third UE 215-c, a fourth UE 215-d, and a fifth UE 215-e. The base station 205 and the UEs 215 may be examples of corresponding devices described herein with reference to FIG. 1.

In some cases, a cluster of the UEs 215 (e.g., a sidelink cluster) may perform sidelink communications over available time and frequency resources of a sidelink channel to communicate directly with each other (e.g., without signaling going through the base station 205). In some examples, the UEs 215 and the base station 205 may communicate within the geographic coverage area 210 of the base station 205. For example, the UEs 215 may communicate with the base station 205 via respective communication links 220 (e.g., uplink transmissions and downlink transmissions). In some cases, the communication links 220 may be anchor links between each of the UEs 215 and the base station 205 (e.g., a gNB).

In some cases, a sidelink cluster may include heterogeneous sidelink links including one or more heavy-loading sidelink links 225, one or more light-loading sidelink links 230, and the like. For example, the first UE 215-a (also referred to as UE1) may communicate with the second UE 215-b (also referred to as UE2) over a heavy-loading sidelink link 225-a, and the third UE 215-c (also referred to as UE3) may communicate with the fourth UE 215-d (also referred to as UE4) over a heavy-loading sidelink link 225-b. The heavy-loading sidelink links 225 may carry eMBB (e.g., long bursts) which are associated with high spectral efficiency needs. In some cases, the second UE 215-b may also communicate with the fifth UE 215-e (also referred to as UE5) over a light-loading sidelink link 230-a, and the third UE 215-c may also communicate with the fifth UE 215-e over a light-loading sidelink link 230-b. The light-loading sidelink links 230 may carry sparse (e.g., sporadic) packets.

The base station 205 may provide wireless communication services to the UEs 215 to enable sidelink communications between the UEs 215. For example, the base station 205 may configure the UEs 215 to perform sidelink communications according to various channel access modes. As described with reference to FIG. 1, the various channel access modes may include at least a first channel access mode (e.g., Mode 1) and a second channel access mode (e.g., Mode 2), where the first mode includes the base station allocating specific resources to each UE 215 and the second mode includes the base station 205 configuring a pool of shared resources (e.g., resource pool) that the UEs 215 attempt to use autonomously by reserving one or more resources from the pool based on a sensing procedure. However, in some cases, the sensing procedure (e.g., based on random access) may compromise power efficiency based on the UEs 215 having to expend power to perform said sensing procedure. Additionally, a cluster of UEs 215 performing sidelink communications (e.g., a sidelink cluster) may have poor or weak network control due to poor coverage (e.g., being on the edge of geographic coverage area 210), downlink channel capacity may be impacted when managing a large number of sidelink links, or both. Further, sidelink UEs 215 may be battery powered, where both the first channel access mode and the second channel access mode may unnecessarily expend the battery power.

Various aspects of the present disclosure relate to assigning individual resources of a resource pool configured for the second channel access mode to specific UEs 215 in a sidelink cluster. For example, the first UE 215-a (e.g., UE1) may send a request to the base station 205 (or an anchor/master UE) for transmission over sidelink. Subsequently, the base station 205 may configure the first UE 215-a to operate according to an enhanced version of the second channel access mode. That is, the base station 205 may configure the first UE 215-a with one or more sidelink resources within the resource pool configured for the second channel access mode, such that the first UE 215-a may access the one or more sidelink resources for the transmission over sidelink without performing the sensing procedure associated with the second channel access procedure. In some examples, the base station 205 may configure the first UE 215-a with the one or more sidelink resources (e.g., preconfigured resources) via RRC signaling, a DCI message, or both.

In some cases, the first UE 215-a may use the configured resources (e.g., without sensing) for sidelink HARQ transmissions, which is described in greater detail with reference to FIG. 3. In some examples, synchronization UE(s) (e.g., chosen by the base station 205) may also receive information on additional configured resources (to additional UEs 215 in the sidelink cluster, such as the second UE 215-b, the third UE 215-c, the fourth UE 215-d, the fifth UE 215-e, etc.) and may broadcast an indication of the additional configured resources to the other UEs 215 in the sidelink cluster (e.g., over an extended sidelink broadcast channel). Additionally or alternatively, the base station 205 may broadcast (e.g., via a SIB) an indication of the configured resources for each UE 215 to the UEs 215 in the sidelink cluster. Examples of resource configurations are described in greater detail also with reference to FIG. 3. In some cases, the first UE 215-a (e.g., or an additional UE 215, such as the second UE 215-b, the third UE 215-c, the fourth UE 215-d, the fifth UE 215-e, etc.) may indicate resource skipping to the other UEs 215 in the sidelink cluster (e.g., temporally releasing a configured resource for the first UE 215-a for opportunistic reuse by other sidelink UEs 215), which is described in greater detail with reference to FIG. 4.

Additionally, in some examples, the first UE 215-a may be configured to use a non-zero CP extension when transmitting on the configured sidelink resources, which is described in greater detail with reference to FIG. 5A. The configured sidelink resources may include different types of resources, such as resources with non-zero CPs, resources without CPs, resources indicated via a broadcast message, or a combination thereof. In some examples, the type of resource may change, which is described in greater detail with reference to FIG. 5B. Additionally, the first UE 215-a may be configured to send the base station 205 periodic reports (e.g., including a CBR estimate, a skipping ration, a BSR, an LBT failure, among other elements), where the periodic reports may affect or determine the one or more configured sidelink resources for the first UE 215-a. In some cases, the first UE 215-a (e.g., or an additional UE 215 in the sidelink cluster) may receive a receiving configuration indicating time instances (e.g., sets of slots) where the first UE 215-a operates in a receiving mode, which is described in greater detail with reference to FIG. 6. Additionally, while the base station 205 is described as the device that allocates the specific resources from the resource pool for the second channel access mode to each UE 215, a master or anchor UE 115 may allocate the specific resources from the resource pool to itself, to other UEs 215, or both, which is described in greater detail with reference to FIG. 7.

Figure 3:
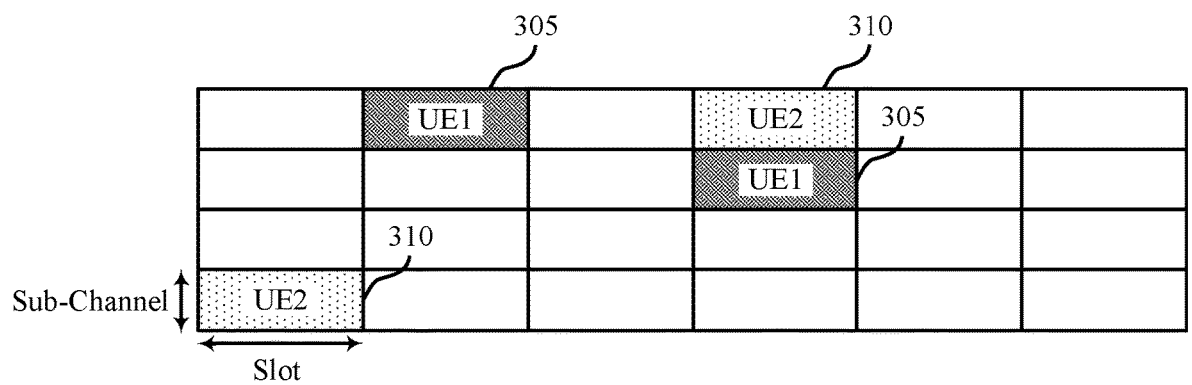
FIG. 3 illustrates an example of a resource pool that supports techniques for configuring resources in a sidelink resource pool in accordance with various aspects of the present disclosure.

FIG. 3 illustrates an example of a resource pool 300 that supports techniques for configuring resources in a sidelink resource pool in accordance with various aspects of the present disclosure. In some examples, the resource pool may implement aspects of or may be implemented by aspects of the wireless communications system 100, the wireless communications system 200, or both. For example, the resource pool 300 may be configured by a base station 105 for a cluster of sidelink UEs 115. The base station 105 and the UEs 115 may be examples of corresponding devices described herein with reference to FIGS. 1 and 2. The resource pool 300 may include multiple resources that can be used for sidelink communications, where the multiple resources are defined per sub-channel (e.g., or other divisions in frequency) and slot (e.g., or other divisions in time).

As described herein, the base station 105 (or an anchor/master UE 115) may allocate specific resources in the resource pool 300 to individual UEs 115 for those UEs 115 to use for sidelink communications. In some examples, the resource pool 300 may represent a pool of shared or common resources configured by the base station 105 for a second channel access mode for sidelink communications as described with reference to FIGS. 1 and 2 or an additional pool of resources (e.g., unlicensed radio frequency spectrum resources). However, rather than performing a sensing procedure to reserve one or more resources from the resource pool 300, the base station 105 may allocate one or more of the resources in the resource pool 300 to respective UEs 115. In some examples, the UEs 115 may be a set of UEs 115 that carry heavy-loading sidelink traffic. Additionally, the UEs 115 may be assigned an orthogonal set of sidelink resources from the resource pool 300 that may be accessed without sensing. This assignment of resources in the resource pool 300 may increase spectral efficiency while also improving power efficiency. In some examples, the base station 105 may assign or allocate one or more sidelink resources 305 to a first UE 115 and one or more sidelink resources 310 to a second UE 115 (e.g., UE2). Additionally, the base station 105 may configure the first UE 115 with the one or more sidelink resources 305 (e.g., a first set of preconfigured resources) and the second UE with the one or more sidelink resources 310 (e.g., a second set of preconfigured resources) via RRC signaling, a DCI message, or both.

In some cases, the first UE 115 and the second UE may use their corresponding configured resources (e.g., the one or more sidelink resources 305 and the one or more sidelink resources 310, respectively) for sidelink HARQ transmissions (e.g., without sensing whether the respective resources are available). In some examples, synchronization UE(s) 115 (e.g., chosen by the base station 105) may also receive information on additional configured resources that have been assigned or allocated to additional UEs 115 in the sidelink cluster (e.g., from the base station) and may broadcast an indication of the additional configured resources to the other UEs 115 in the sidelink cluster (e.g., over an extended sidelink broadcast channel). For example, the base station 105 may transmit an indication, to the first UE 115, of the one or more sidelink resources 310 assigned to the second UE 115, and the first UE 115 may then broadcast this indication to additional nearby UEs 115 to indicate the one or more sidelink resources 310 are assigned/reserved and are unavailable to be reserved autonomously. Additionally or alternatively, the base station 105 may broadcast (e.g., via a SIB) an indication of the configured resources for each UE 115 to the UEs 115 in the sidelink cluster. In some cases, a UE 115 with preconfigured resources (e.g., the first UE 115-a with the one or more sidelink resources 305) may send an SCI message to temporarily release subsequent unused sidelink resources within the resource pool 300 configured for itself, which is described in greater detail with reference to FIG. 4.

In some examples, the first UE 115 may use the one or more sidelink resources 305 (e.g., configured resources) for initial sidelink HARQ transmissions, sidelink HARQ retransmissions, or both. For example, the first UE 115 may use the one or more sidelink resources 305 for both initial HARQ transmissions and HARQ retransmissions (e.g., without sensing prior to transmitting either). Additionally or alternatively, the first UE 115 may use the one or more sidelink resources 305 for initial HARQ transmissions and then may use sensing to configure or reserve additional resources in the resource pool 300 for HARQ retransmissions. Additionally or alternatively, the first UE 115 may use the one or more sidelink resources 305 for initial HARQ transmissions and may send a request to the base station 105 for sidelink resources for HARQ retransmissions. To support the request for the sidelink resources for the HARQ retransmissions, the base station 105 may keep an additional small set of sidelink resources for DG allocated resources in the resource pool 300.

Additionally, synchronization UE(s) 115 (e.g., chosen by the base station 105) may also receive information on configured resources assigned or allocated to additional UEs 115 in the sidelink cluster and may broadcast an indication of the additional configured resources to the other UEs 115 in the sidelink cluster (e.g., over an extended physical sidelink broadcast channel (PSBCH)). Additionally or alternatively, the synchronization UE(s) 115 may broadcast the indication in sidelink remaining minimum system information (RMSI) that is multiplexed with a sidelink synchronization signal block (e.g., or a synchronization signal/PSBCH block). This indication of the additional configured resources may be used by sidelink UEs 115s configured with the resource pool 300 to conduct a configuration-aware sensing. For example, the UEs 115 may exclude the configured resources (e.g., the one or more sidelink resources 305 and the one or more sidelink resources 310) when performing the sensing (e.g., from a resource selection window to perform the sensing) when a sidelink UE 115 sends a sensing request from a MAC layer to a physical (PHY) layer. Additionally or alternatively, the UEs 115 may exclude the configured resources from a set of candidate resources reported by the PHY layer of the UEs 115 before conducting a random resource selection at the MAC layer of the UEs 115. In some examples, the base station 105 may broadcast the indication of the configured resources for each UE 115 as a SIB.

Figure 4:
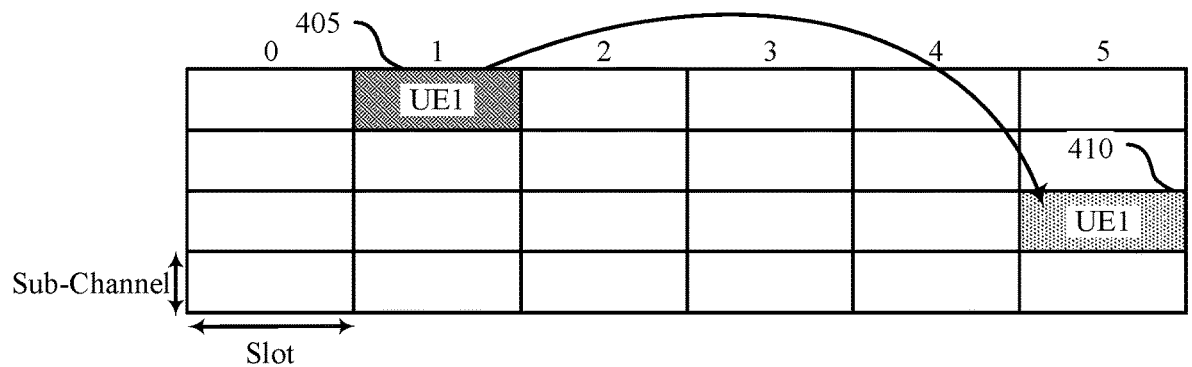
FIG. 4 illustrates an example of a resource pool that supports techniques for configuring resources in a sidelink resource pool in accordance with various aspects of the present disclosure.

FIG. 4 illustrates an example of a resource pool 400 that supports techniques for configuring resources in a sidelink resource pool in accordance with various aspects of the present disclosure. In some examples, the resource pool may implement aspects of or may be implemented by aspects of the wireless communications system 100, the wireless communications system 200, or both. For example, the resource pool 400 may be configured by a base station 105 for a cluster of sidelink UEs 115. The base station 105 and the UEs 115 may be examples of corresponding devices described herein with reference to FIGS. 1-3. Additionally, as described herein and with reference to FIGS. 2 and 3, the base station 105 (or an anchor/master UE 115) may allocate specific resources in the resource pool 400 to individual UEs 115 for those UEs 115 to use for sidelink communications without performing a sensing procedure, where the resource pool 400 may represent a pool of shared or common resources configured by the base station 105 for a second channel access mode for sidelink communications or an additional pool of resources (e.g., unlicensed radio frequency spectrum resources).

In some examples, the base station 105 may allocate or configure a subset of resources in the resource pool 400 to a first UE 115 (e.g., UE1), where the subset of resources includes at least a first resource 405 (e.g., a first configured resources) and a second resource 410 (e.g., a second configured resource). In some cases, the first UE 115 may not need both the first resource 405 and the second resource 410 for its intended sidelink transmissions. For example, the first UE 115 may complete an intended sidelink transmission using the first resource 405 (e.g., or previous configured resources), the base station 105 (or the anchor/master UE 115) allocates a greater number of resources to the first UE 115 than the first UE 115 needs, or another scenario may occur resulting in the first UE 115 at least not needing, for example, the second resource 410. Accordingly, the first UE 115 may indicate resource skipping to the other UEs 115 in the sidelink cluster, where the indicated resource skipping temporally releases a configured resource for the first UE 115 for opportunistic reuse by other sidelink UEs 115. For example, the first UE 115 (e.g., UE1) may send, in the first resource 405 (e.g., in a first resource time instance, such as a slot), an SCI to indicate the skipping of the second resource 410 (e.g., a preconfigured resource in a fifth resource time instance). In some cases, the SCI may indicate the skipping of a single preconfigured future instance (e.g., a single configured future resource), a set of preconfigured future instances defined by available time and frequency resources of a sidelink channel (e.g., multiple configured future resources), a set of preconfigured future instances with a specified periodicity (e.g., when the preconfigured resources are periodically configured), or a combination thereof.

Figure 5A:
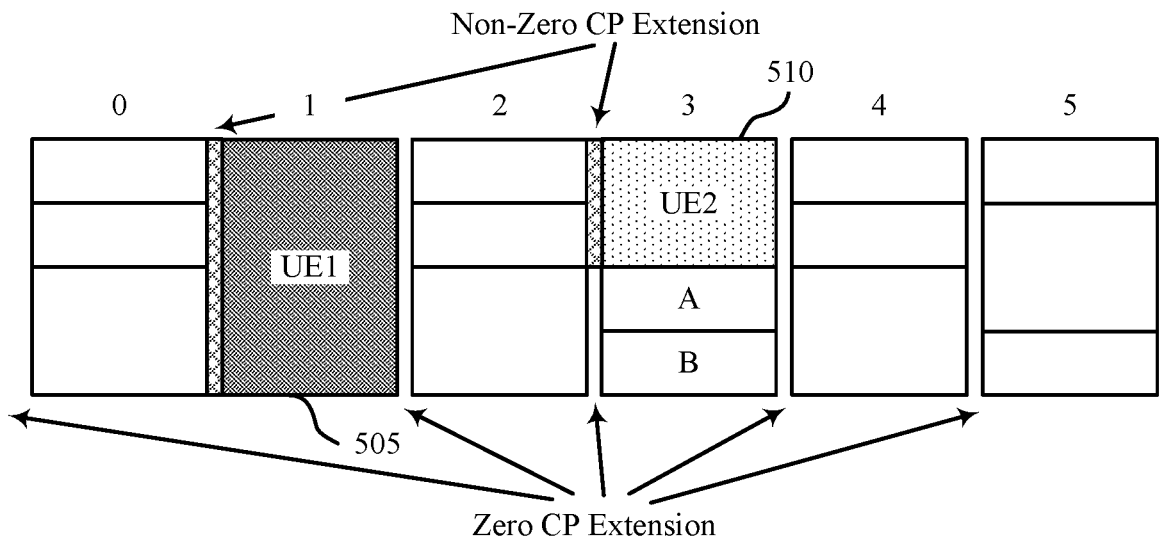
FIGS. 5A and 5B illustrate examples of a resource pool and a timeline, respectively, that support techniques for configuring resources in a sidelink resource pool in accordance with various aspects of the present disclosure.
Figure 5B:
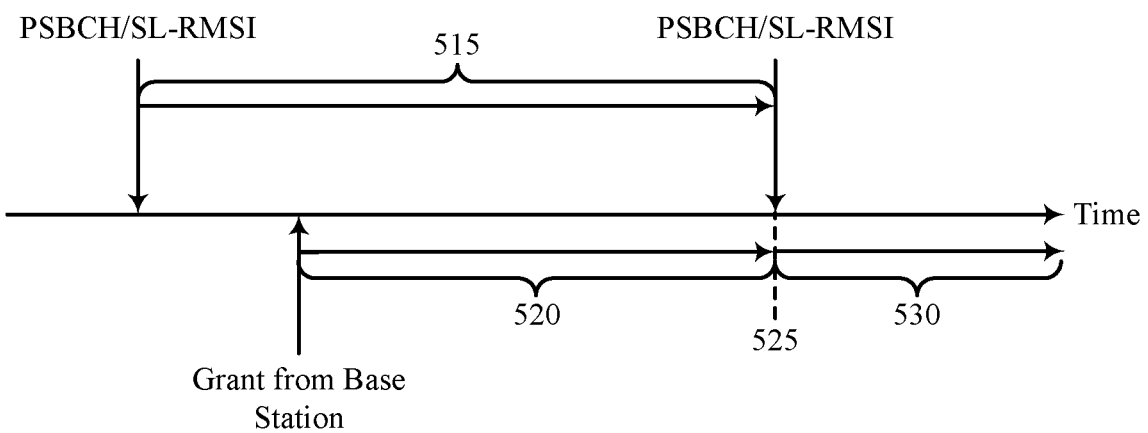

FIG. 5A illustrates an example of a resource pool 500 that supports techniques for configuring resources in a sidelink resource pool in accordance with various aspects of the present disclosure. FIG. 5B illustrates an example of a timeline 501 that supports techniques for configuring resources in a sidelink resource pool in accordance with various aspects of the present disclosure. In some examples, the resource pool 500 and the timeline 501 may implement aspects of or may be implemented by aspects of the wireless communications system 100, the wireless communications system 200, or both. For example, the resource pool 500 may be configured by a base station 105 for a cluster of sidelink UEs 115, where individual resources in the resource pool are configured or allocated to individual UEs 115 of the cluster of sidelink UEs 115, and the timeline 501 may be used by the base station 105 and the cluster of sidelink UEs 115 to determine a type of resource for the configured or allocated resources. For example, the base station 105 may configure a first resource 505 from the resource pool 500 to a first UE 115 (e.g., UE1) and may configure a second resource 510 from the resource pool 500 to a second UE 115 (e.g., UE2). The base station 105 and the UEs 115 may be examples of corresponding devices described herein with reference to FIGS. 1-4.

In some cases, when deployed in an unlicensed band where LBT procedures are used to access resources in the unlicensed band, the first UE 115 may be configured to use a non-zero CP extension on the first resource 505 to facilitate conducting LBT on the first resource 505 (e.g., by additional UEs 115 in the cluster of sidelink UEs 115). Similarly, the second UE 115 may be configured to use a non-zero CP extension on the second resource 510. Additionally or alternatively, the remaining resources in the resource pool (e.g., those resources that have not been configured or allocated to specific UEs 115) may include a zero CP extension to facilitate the use of the remaining resources by other UEs 115 using the resource pool 500 for a sensing-based channel access mode (e.g., Mode 2 or the second channel access mode as described herein).

Accordingly, using non-zero CP extensions and zero CP extensions for respective resources in the resource pool 500 may facilitate opportunistic use of configured resources by other UEs 115 in the cluster of sidelink UEs 115 based on the other UEs 115 detecting whether resources are about to be used by a UE 115 if a non-zero CP extension precedes the resource or not. In some cases, the use of the non-zero CP extension may block frequency division multiplexed channel access in a same time instance (e.g., slot) as the configured resource that includes the non-zero CP extension. For example, channel access to a resource A and/or a resource B may be blocked by the second UE 115 using the non-zero CP extension for the second resource 510 (e.g., the second UE 115 accessing or using the second resource 510) if LBT procedures performed on the resource A and/or the resource B fail based on the resources being within a same energy detection range (e.g., the non-zero CP extension makes it appear that the resource A and/or the resource B are reserved or about to be used based on the energy detection range).

In some examples, the configured resources for a sidelink UE 115 (e.g., the first UE 115, the second UE 115, etc.) operating in an unlicensed band may include multiple types that may be accessed without sensing. Additionally, the types of resources for the configured resources may depend on whether a synchronization UE 115 (e.g., or the base station 105) broadcasts an indication of resources that have been configured for corresponding UEs 115 in the cluster of sidelink UEs 115, whether the UEs 115 are configured to use non-zero CP extensions on their respective configured resources, or both. For example, a first type of configured resource may include a non-zero CP extension, where the configured resource has not been explicitly indicated by the base station 105 or by the synchronization UE 115 (e.g., in a PSBCH, sidelink RMSI, SIB, etc.) to the other UEs 115 in the cluster of sidelink UEs 115. In some examples, this first type of configured resources may be used or defined based on a limited capacity of the PSBCH if no sidelink RMSI is available. Additionally or alternatively, a second type of configured resource may be explicitly indicated by the base station 105 or by the synchronization UE 115 (e.g., in PSBCH, sidelink RMSI, SIB, etc.) and may include a zero CP extension. In some examples, this second type of configured resource may be used to avoid LBT blocking to co-slot or frequency division multiplexed channel access as discussed with reference to FIG. 5A. Additionally or alternatively, a third type of configured resource may include a non-zero CP extension and may be explicitly indicated by the base station 105 or by the synchronization UE 115 (e.g., in a PSBCH, sidelink RMSI, SIB, etc.).

In some cases, a sidelink UE 115 operating in an unlicensed band may have a configured resource with a changing type. For example, as shown in the example of FIG. 5B, a UE 115 may operate in an unlicensed band, and the UE 115 may be granted with (e.g., receive a grant from the base station 105 or an anchor/master UE 115) a first resource that includes the first type of configured resource as described previously with reference to FIG. 5A. That is, the first resource may be initially configured as including the first type of configured resource that uses a non-zero CP extension and has not been explicitly indicated by the base station 105 or by the synchronization UE 115 (e.g., without a PSBCH, sidelink (SL) RMSI, or SIB indication) to additional UEs 115. For example, the grant from the base station 105 (or the anchor/master UE 115) allocating the first resource to the UE 115 may be received after an indication (e.g., PSBCH/SL-RMSI) is transmitted at the beginning of a periodicity 515 (e.g., the base station 105 or the synchronization UE 115 transmits the indications according to the periodicity 515, such as a 160 ms periodicity), so other UEs 115 may not be aware that the first resource has been configured or allocated to the UE 115. As such, the UE 115 may use the non-zero CP for the first resource if the first resource is used during a duration 520 to enable the other UEs 115 to identify that the first resource is unavailable to be used or reserved by them.

However, at a time instance 525, the base station 105 or the synchronization UE 115 may transmit an indication (e.g., PBSCH/SL-RMSI/SIB) of resources that have been configured or allocated to different UEs 115 in the cluster of sidelink UEs 115, including the first resource being configured or allocated to the UE 115. Accordingly, the first resource may be converted to the second type of configured resource after the indication is broadcasted at time instance 525, where the second of configured resource is described with reference to FIG. 5A such that the first resource includes a zero CP extension and has been explicitly indicated by the base station 105 or the synchronization UE 115 (e.g., via the PSBCH, sidelink RMSI, or SIB indication). Subsequently, if the UE 115 uses the first resource during a duration 530, the first resource may include the second type of configured resource based on the cluster of sidelink UEs 115 receiving the explicit indication at the time instance 525.

Accordingly, the configured sidelink resources may include resources with non-zero CPs, resources with zero CPs, resources indicated via a broadcast message, or a combination thereof, and the type of resource may change. Additionally, in some examples, one or more of the UEs 115 of the cluster of sidelink UEs 115 may be configured to send the base station 105 periodic reports (e.g., including a CBR estimate, a skipping ration, a BSR, an LBT failure, among other elements), where the periodic reports may affect or determine the one or more configured sidelink resources for the corresponding UEs 115 in the cluster of sidelink UEs 115. Additionally or alternatively, the UEs 115 may be configured with an implicit release counter to determine when to release any configured resources. For example, the counter may increase by one if the a UE 115 does not send the report at a pre-defined time and may be reset to zero after sending a report. When the counter is larger than a pre-defined threshold, the UE 115 may release its configured resources.

Figure 6:
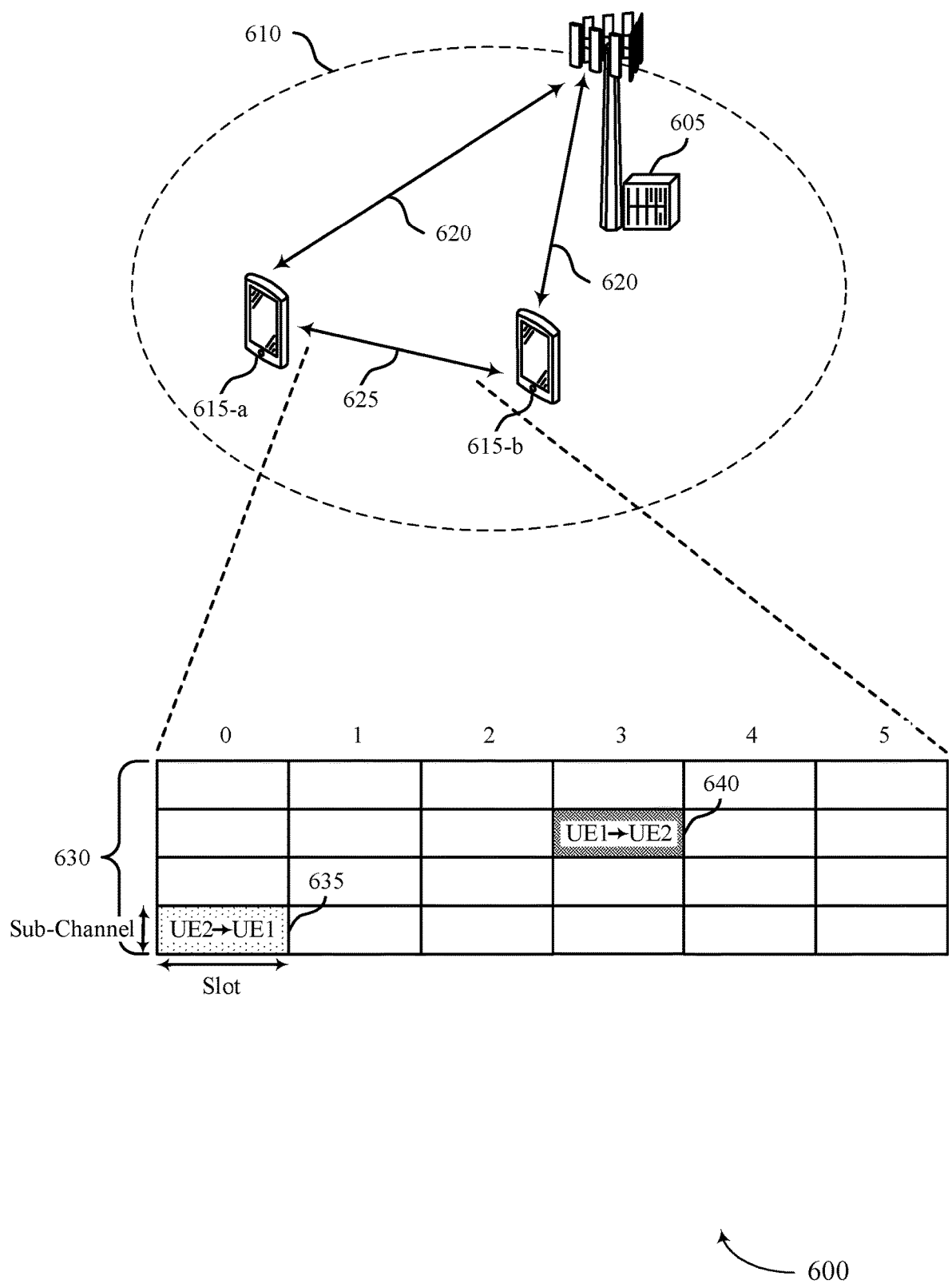
FIG. 6 illustrates an example of a wireless communications system that supports techniques for configuring resources in a sidelink resource pool in accordance with various aspects of the present disclosure.

FIG. 6 illustrates an example of a wireless communications system 600 that supports techniques for configuring resources in a sidelink resource pool in accordance with various aspects of the present disclosure. In some examples, the wireless communications system 600 may implement aspects of or may be implemented by aspects of the wireless communications system 100, the wireless communications system 200, or both. For example, the wireless communications system 600 may include a base station 605 with a corresponding geographic coverage area 610 and a first UE 615-a and a second UE 615-b. The base station 605, the first UE 615-a, and the second UE 615-b may be examples of corresponding devices described herein with reference to FIGS. 1-5B.

In some examples, a cluster of UEs 115 (e.g., a sidelink cluster including the first UE 615-a and the second UE 615-b) and the base station 605 may communicate within the geographic coverage area 610 of the base station 605. For example, the first UE 615-a and the second UE 615-b may communicate with the base station 605 via respective communication links 620 (e.g., uplink transmissions and downlink transmissions). In some cases, the communication links 620 may be an anchor link between the first UE 615-a or the second UE 615-b and the base station 605. Additionally, the cluster of UEs 115 (e.g., a sidelink cluster) may include the first UE 615-a (e.g., referred to as UE1) which may communicate with the second UE 615-b (e.g., referred to as UE2) over a sidelink 625. In some example, the sidelink 625 may include a heavy-loading sidelink link for carrying eMBB traffic (e.g., long bursts) with a high spectral efficiency.

In some cases, the first UE 615-a (e.g., or an additional UE 115 in the sidelink cluster) may receive a receiving configuration indicating time instances (e.g., sets of slots) where the first UE 615-a operates in a receiving mode. In some cases, the second UE 615-b (e.g. a peer UE 115) may also be in the coverage area 610 of the base station 605 and may receive the corresponding configuration. For example, a resource pool 630 may be configured for use with a second channel access mode (e.g., Mode 2 as described herein. In some cases, the first UE 615-a may be configured with transmitting and receiving configurations and may use a configuration to communicate with the second UE 615-b (e.g., a receiving UE). Thus, in the resource pool 630, the first UE 615-a may transmit a sidelink message on a resource 635 to the second UE 615-b and the second UE 615-b may transmit a sidelink message on a resource 640 to the first UE 615-a. This configuration may further indicate the time instances (e.g., sub-channel indices) and reduce blind decoding efforts at the receiving UE 115. For example, based on the receiving configuration indicated by the base station 605 (e.g., or by an anchor/master UE 115), the UEs 115 may identify on which resources that the UEs 115 are expected to receive sidelink transmissions from other UEs 115, and the UEs 115 may then monitor for the sidelink transmissions at the corresponding time instances rather than performing blind decodings on all resources in the resource pool 630.

Figure 7:
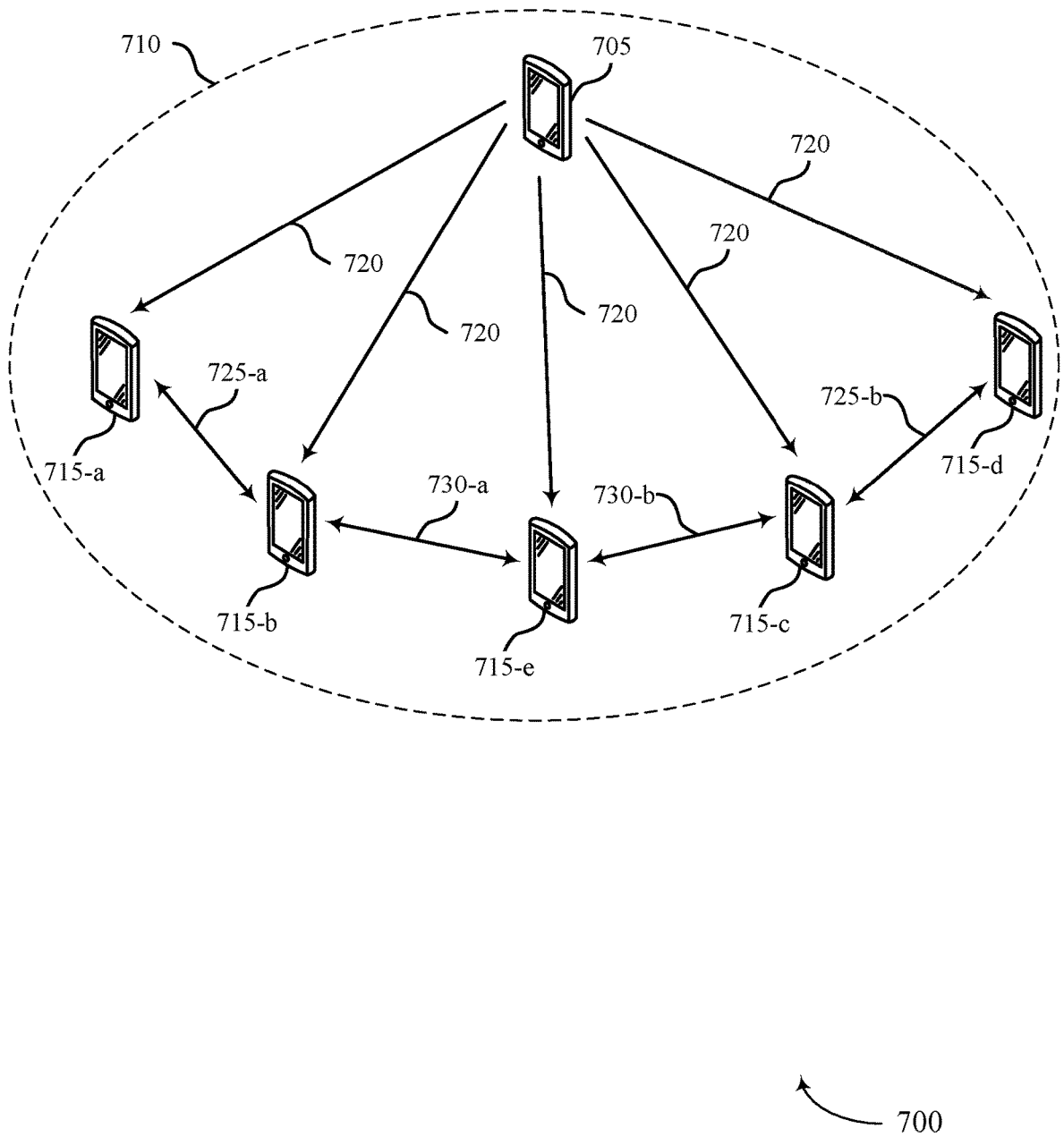
FIG. 7 illustrates an example of a wireless communications system that supports techniques for configuring resources in a sidelink resource pool in accordance with various aspects of the present disclosure.

FIG. 7 illustrates an example of a wireless communications system 700 that supports techniques for configuring resources in a sidelink resource pool in accordance with various aspects of the present disclosure. In some examples, the wireless communications system 700 may implement aspects of or may be implemented by aspects of the wireless communications system 100, the wireless communications system 200, or both. For example, the wireless communications system 200 may include a UE 705 with a corresponding geographic coverage area 710 and one or more additional UEs 715, such as a first UE 715-a, a second UE 715-b, a third UE 715-c, a fourth UE 715-d, and a fifth UE 715-e. The different UEs may be examples of corresponding devices described herein with reference to FIGS. 1-6.

In some cases, a cluster of UEs 115 (e.g., a sidelink cluster) may perform sidelink communications over available time and frequency resources of a sidelink channel to communicate directly with each other. In the absence of a base station 105, the UE 705 may represent an anchor sidelink UE 115 (e.g., master sidelink UE 115, UE0, etc.) that establishes a resource pool for a second channel access mode (e.g., Mode 2 as described with reference to FIGS. 1 and 2). Additionally, the UE 705 may grant itself (e.g., and additional UEs 115 in the cluster of UEs 115, such as the UEs 715) preconfigured resources from the resources pool. The UE 705 may then broadcast an indication of the preconfigured resources to other UEs 115 in the cluster of UEs 115 (e.g., slave UEs). In some examples, the first UE 715-a, the second UE 715-b, the third UE 715-c, the fourth UE 715-d, and the fifth UE 715-e may communicate with the UE 705 within the geographic coverage area 710 via respective communication links 720. The communication links 720 may be an anchor link between the UE 705 and the respective UEs 715 in the sidelink cluster.

In some examples, the cluster of UEs 115 (e.g., the sidelink cluster) may include heterogeneous sidelink links for communications with each other, where the heterogeneous sidelink links include heavy-loading sidelink links 725, light-loading sidelink links 730, and the like. For example, the first UE 715-a (also referred to as UE1) may communicate with the second UE 715-b (also referred to as UE2) over a heavy-loading sidelink link 725-a, and the third UE 715-c (also referred to as UE3) may communicate with the fourth UE 715-d (also referred to as UE4) over a heavy-loading sidelink link 725-b. The heavy-loading sidelink links 725 may carry eMBB traffic (e.g., long bursts) that includes a high spectral efficiency. Additionally or alternatively, the second UE 715-b may also communicate with the fifth UE 715-e (also referred to as UE5) over a light-loading sidelink link 730-a, and the third UE 715-c may also communicate with the fifth UE 715-e over a light-loading sidelink link 730-b. The light-loading sidelink links 730 may carry sparse (e.g., sporadic) packets. In some cases, the UE 705 (UE0) may establish the resource pool for the second channel access mode, may grant resources from the resource pool to different UEs 115 in the cluster (e.g., including itself), and may broadcast an indication of the preconfigured resources to the other UEs 115 (e.g., via PSBCH or sidelink RMSI). In some cases, the slave UEs 115 (e.g., the first UE 715-a, the second UE 715-b, the third UE 715-c, the fourth UE 715-d, and the fifth UE 715-e) may send requests to the UE 705 for preconfigured resources from the resource pool.

Figure 8:
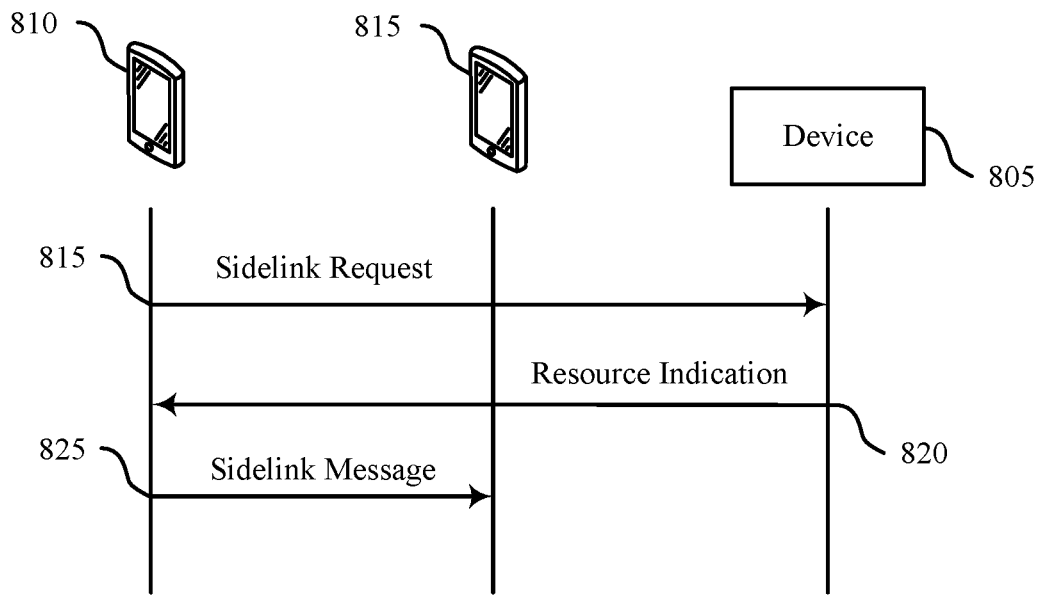
FIG. 8 illustrates an example of a process flow that supports techniques for configuring resources in a sidelink resource pool in accordance with various aspects of the present disclosure.

FIG. 8 illustrates an example of a process flow 800 that supports techniques for configuring resources in a sidelink resource pool in accordance with various aspects of the present disclosure. The process flow 800 may implement aspects of may be implemented by aspects of the wireless communications system 100, the wireless communications system 200, the wireless communications system 600, the wireless communications system 700, or a combination thereof. For example, the process flow 800 may include a device 805, a UE 810, and a UE 815 may be examples of corresponding devices as described with reference to FIGS. 1-7. In some example, the device 805 may represent a base station 105, an anchor/master UE 115, or an additional device capable of scheduling or assigning resources to the UE 810 and the UE 815.

In the following description of the process flow 800, the operations between the device 805, the UE 810, and the UE 815 may be transmitted in a different order than the example order shown, or the operations performed by the device 805, the UE 810, and the UE 815 may be performed in different orders or at different times. Some operations may also be omitted from the process flow 800, and other operations may be added to the process flow 800.

At 810, the UE 810 (e.g., a first UE 115) may send a request to a device 805 to transmit a sidelink message to the UE 815 (e.g., a second UE 115) over sidelink. In some examples, the UE 810 may transmit the request including a request for one or more sidelink resources for transmitting the sidelink message.

At 815, the UE 810 may receive, from the device 805 and in response to the transmitted request, an indication of one or more configured sidelink resources allocated to the UE 810. In some cases, the device 805 may configure the UE 810 to operate according to an enhanced version of the second channel access mode (e.g., Mode 2). For example, the device 805 may allocate the one or more configured sidelink resources to the UE 810 from a pool of sidelink resources configured for a sensing-based channel access procedure (e.g., the Mode 2). In some examples, the device 805 may configure the UE 810 with the one or more sidelink resources (e.g., preconfigured resources) via RRC signaling, a DCI message, or both.

Additionally or alternatively, the UE 810 may receive, from the device 805, an additional indication of one or more additional configured sidelink resources allocated to one or more additional UEs 115, where the one or more additional configured sidelink resources are allocated to the one or more additional UEs from the pool of sidelink resources configured for the sensing-based channel access procedure. In some examples, the UE 810 may receive the additional indication from the device via a broadcast message (e.g., a SIB). Subsequently, the UE 810 may transmit the additional indication of the one or more additional configured sidelink resources via a sidelink broadcast channel message. In some examples, the UE 810 may transmit the additional indication of the one or more additional configured sidelink resources via a sidelink remaining system information (e.g., sidelink RMSI) message that is frequency division multiplexed with the sidelink broadcast channel message.

In some examples, the UE 810 may transmit, to the device 805, one or more periodical reports, where the one or more configured sidelink resources are based on the one or more periodical reports. Additionally, the UE 810 may release the one or more configured sidelink resources based on a configured release counter.

At 820, the UE 810 may transmit the sidelink message to the UE 815 on at least one of the configured sidelink resources. For example, the UE 810 may transmit the sidelink message on the at least one of the one or more configured sidelink independent of performing the sensing-based channel access procedure. In some cases, the UE 815 may use the configured resources (e.g., without sensing) for one or more sidelink HARQ transmissions. For example, the UE 810 may transmit, to the UE 815, an initial HARQ transmission on the at least one of the one or more configured sidelink resources and may transmit one or more HARQ retransmissions based on transmitting a second request to the device, performing the sensing-based channel access procedure, or a combination thereof. Additionally or alternatively, the UE 810 may transmit an initial HARQ transmission, one or more HARQ retransmissions, or a combination thereof one the at least one of the one or more configured sidelink resources.

In some examples, the UE 810 may transmit the sidelink message on the at least one of the one or more configured sidelink resources with a non-zero CP extension. Additionally or alternatively, the one or more configured sidelink resources may include sidelink resources with a non-zero CP extension, sidelink resources with a zero CP extension, sidelink resources indicated by a sidelink broadcast channel, or a combination thereof.

In some examples, the UE 810 may transmit, on a first configured sidelink resource of the one or more configured sidelink resources allocated to the UE 810, an additional indication corresponding to one or more subsequent configured sidelink resources of the one or more configured sidelink resources after the first configured sidelink resource, where the one or more subsequent configured sidelink resources are available to be used by additional UEs 115. For example, the additional indication corresponding to the one or more subsequent configured sidelink resources may include a single subsequent configured sidelink resource, a set of subsequent configured sidelink resources defined by a time-frequency window, a set of subsequent configured sidelink resources with a specified periodicity, or a combination thereof, for resource(s) that are available for use by additional UEs 115.

Additionally, the UE 810 may receive, from the device 805, a reception configuration including an additional indication of one or more time instances for operating in a receiving mode for sidelink communications with an additional device.

Figure 9:
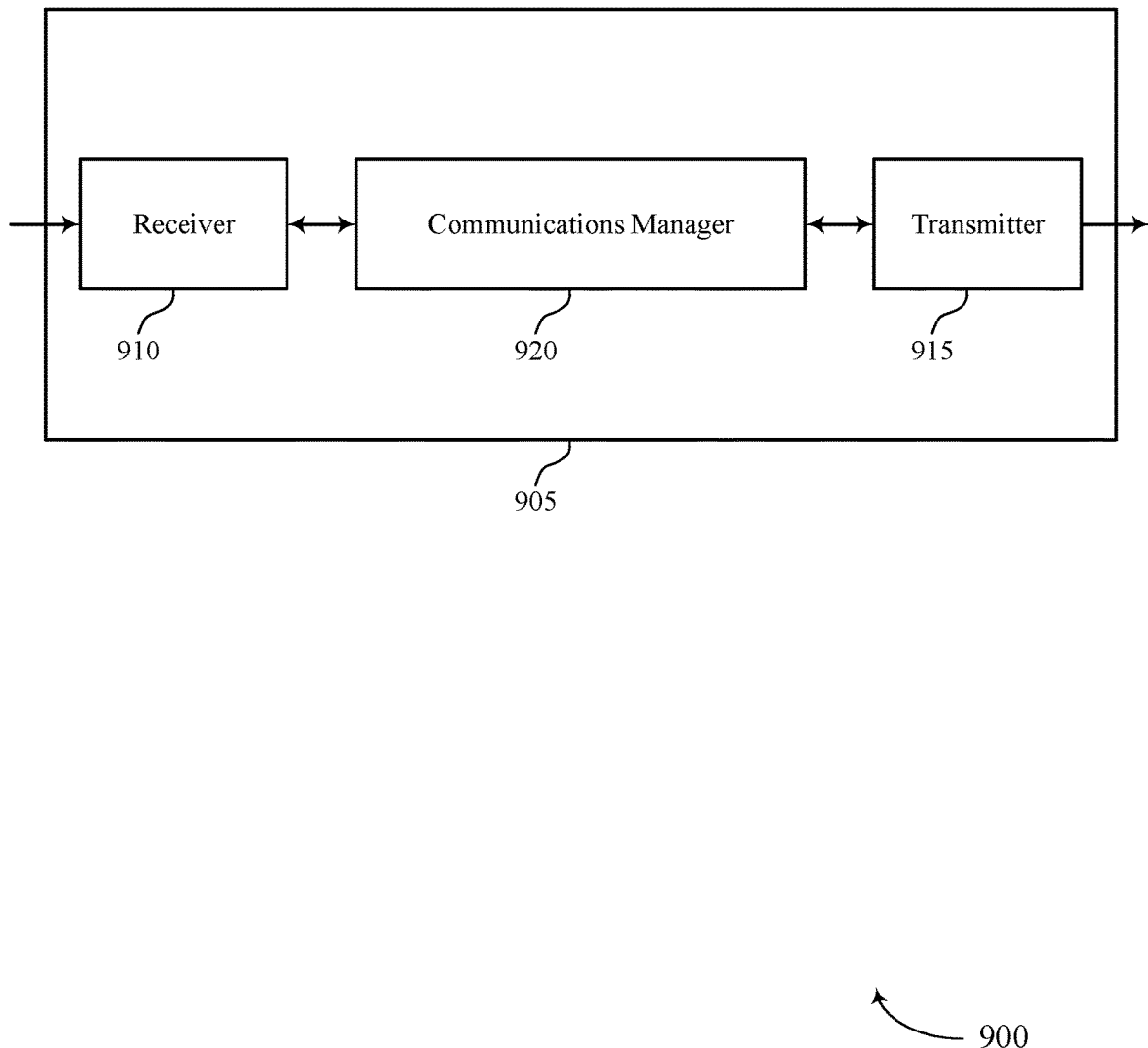
FIGS. 9 and 10 show block diagrams of devices that support techniques for configuring resources in a sidelink resource pool in accordance with various aspects of the present disclosure.

FIG. 9 shows a block diagram 900 of a device 905 that supports techniques for configuring resources in a sidelink resource pool in accordance with various aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for configuring resources in a sidelink resource pool). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for configuring resources in a sidelink resource pool). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for configuring resources in a sidelink resource pool as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. For example, the communications manager 920 may be configured as or otherwise support a means for transmitting, to a device, a request to transmit one or more sidelink messages to a second UE. The communications manager 920 may be configured as or otherwise support a means for receiving, from the device and based on the transmitted request, an indication of one or more configured sidelink resources allocated to the first UE, the one or more configured sidelink resources being allocated to the first UE from a pool of sidelink resources configured for a sensing-based channel access procedure. The communications manager 920 may be configured as or otherwise support a means for transmitting, to the second UE on at least one of the one or more configured sidelink resources, the sidelink message based on the received indication.

Additionally or alternatively, the communications manager 920 may support wireless communications at a device in accordance with examples as disclosed herein. For example, the communications manager 920 may be configured as or otherwise support a means for receiving, from a first UE, a request for the first UE to transmit one or more sidelink messages to a second UE. The communications manager 920 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improving spectral efficiency and increasing overall power efficiency by assigning individual resources of a resource pool configured for the second channel access mode to specific UEs in a sidelink cluster. Further, configuring a UE to operate according to an enhanced version of the second channel access mode may result in improved data throughput, decreased delays, and improved user experience.

Figure 10:
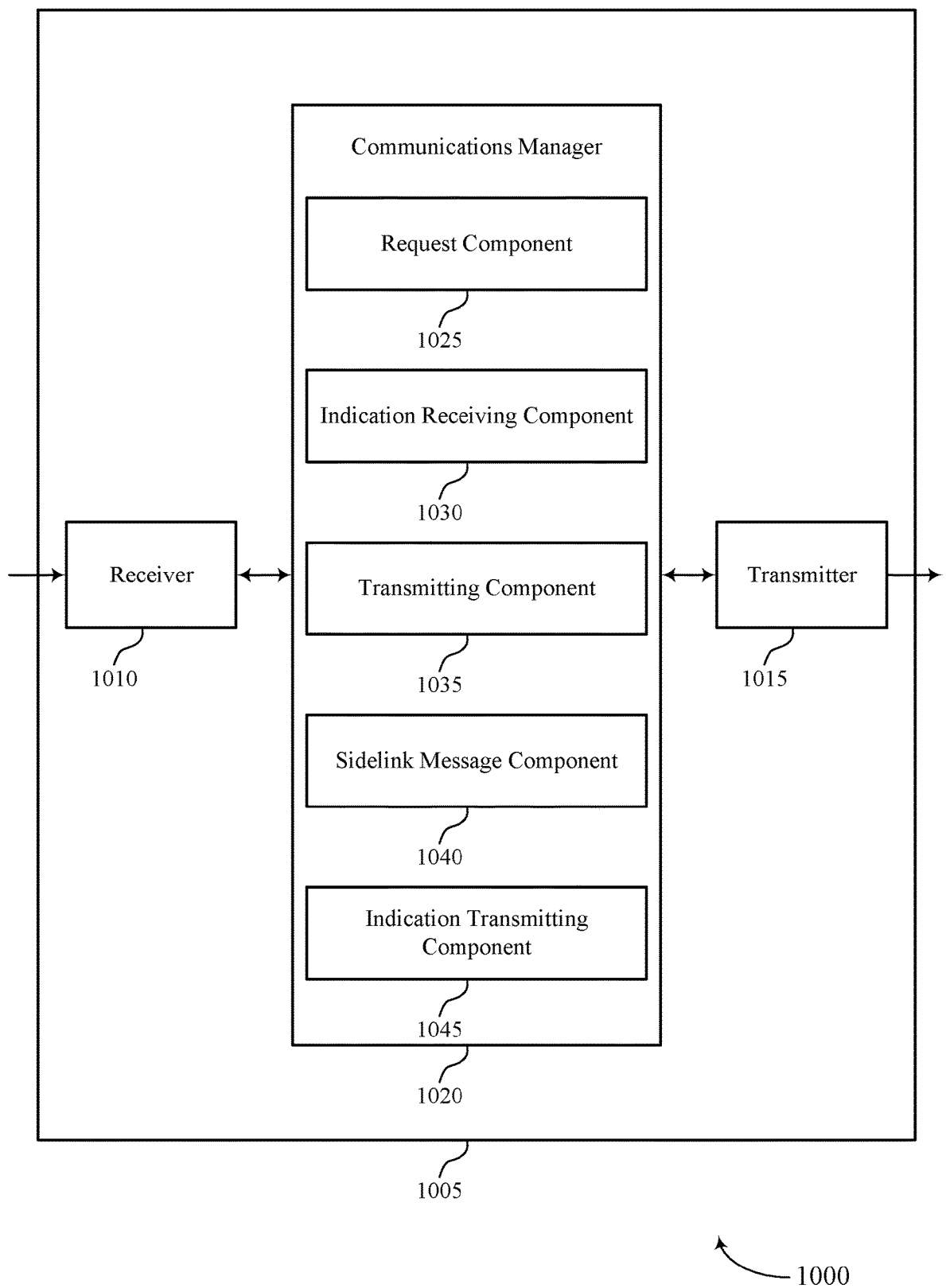

FIG. 10 shows a block diagram 1000 of a device 1005 that supports techniques for configuring resources in a sidelink resource pool in accordance with various aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for configuring resources in a sidelink resource pool). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for configuring resources in a sidelink resource pool). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for configuring resources in a sidelink resource pool as described herein. For example, the communications manager 1020 may include a request component 1025, an indication receiving component 1030, a transmitting component 1035, a sidelink message component 1040, an indication transmitting component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first UE in accordance with examples as disclosed herein. The request component 1025 may be configured as or otherwise support a means for transmitting, to a device, a request to transmit one or more sidelink messages to a second UE. The indication receiving component 1030 may be configured as or otherwise support a means for receiving, from the device and based on the transmitted request, an indication of one or more configured sidelink resources allocated to the first UE, the one or more configured sidelink resources being allocated to the first UE from a pool of sidelink resources configured for a sensing-based channel access procedure. The transmitting component 1035 may be configured as or otherwise support a means for transmitting, to the second UE on at least one of the one or more configured sidelink resources, the sidelink message based on the received indication.

Additionally or alternatively, the communications manager 1020 may support wireless communications at a device in accordance with examples as disclosed herein. The sidelink message component 1040 may be configured as or otherwise support a means for receiving, from a first UE, a request for the first UE to transmit one or more sidelink messages to a second UE. The indication transmitting component 1045 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

Figure 11:
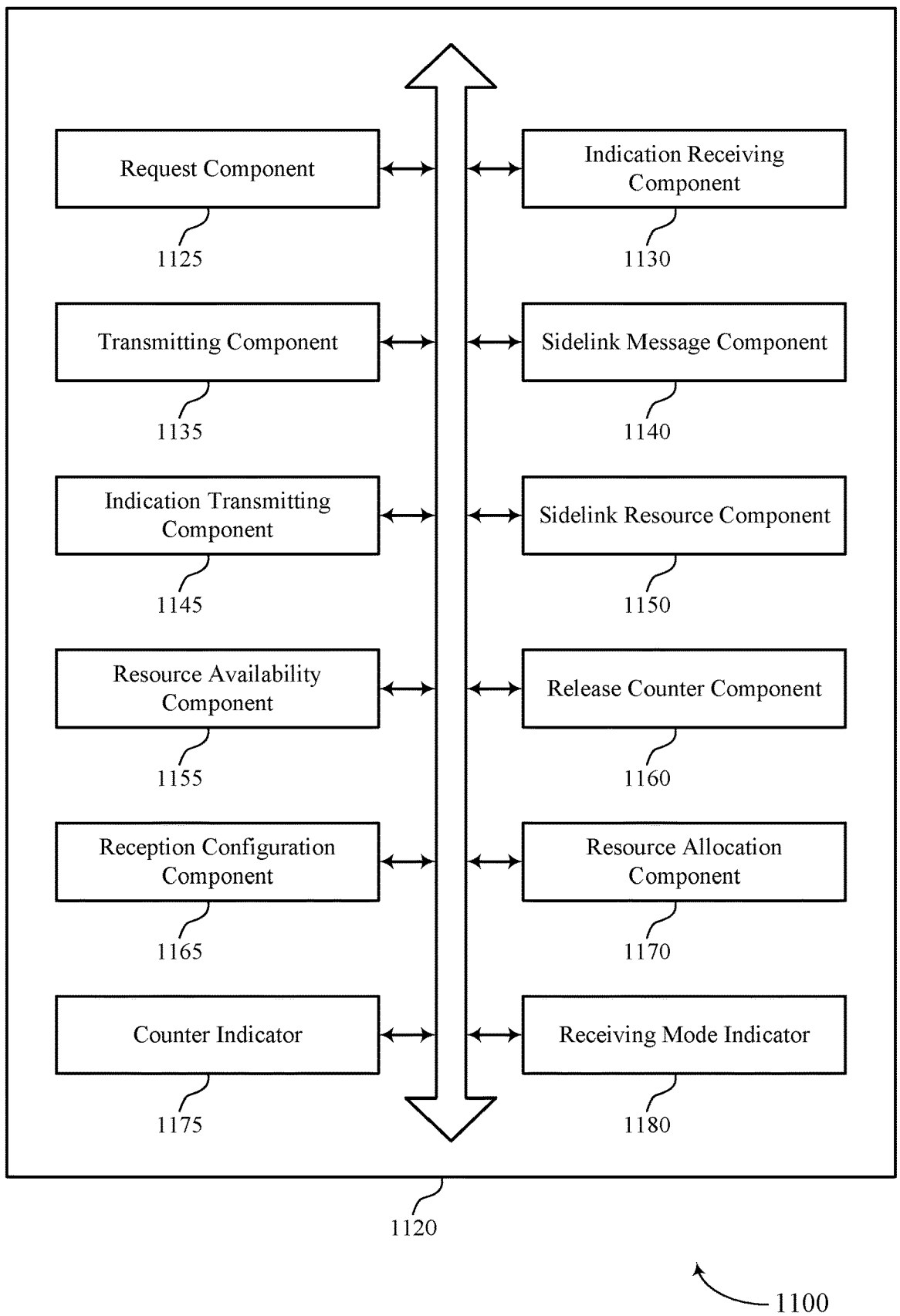
FIG. 11 shows a block diagram of a communications manager that supports techniques for configuring resources in a sidelink resource pool in accordance with various aspects of the present disclosure.

FIG. 11 shows a block diagram 1100 of a communications manager 1120 that supports techniques for configuring resources in a sidelink resource pool in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for configuring resources in a sidelink resource pool as described herein. For example, the communications manager 1120 may include a request component 1125, an indication receiving component 1130, a transmitting component 1135, a sidelink message component 1140, an indication transmitting component 1145, a sidelink resource component 1150, a resource availability component 1155, a release counter component 1160, a reception configuration component 1165, a resource allocation component 1170, a counter indicator 1175, a receiving mode indicator 1180, or any combination thereof. Each of these components may communicate, directly or indirectly, with one another (e.g., via one or more buses).

The communications manager 1120 may support wireless communications at a first UE in accordance with examples as disclosed herein. The request component 1125 may be configured as or otherwise support a means for transmitting, to a device, a request to transmit one or more sidelink messages to a second UE. The indication receiving component 1130 may be configured as or otherwise support a means for receiving, from the device and based on the transmitted request, an indication of one or more configured sidelink resources allocated to the first UE, the one or more configured sidelink resources being allocated to the first UE from a pool of sidelink resources configured for a sensing-based channel access procedure. The transmitting component 1135 may be configured as or otherwise support a means for transmitting, to the second UE on at least one of the one or more configured sidelink resources, the sidelink message based on the received indication.

In some examples, to support receiving the indication of the one or more configured sidelink resources allocated to the first UE, the indication receiving component 1130 may be configured as or otherwise support a means for receiving the indication via radio resource control signaling, a downlink control information message, or both.

In some examples, to support transmitting the sidelink message, the transmitting component 1135 may be configured as or otherwise support a means for transmitting, to the second UE, one or more hybrid automatic repeat request transmissions on the at least one of the one or more configured sidelink resources.

In some examples, the transmitting component 1135 may be configured as or otherwise support a means for transmitting, to the second UE, an initial hybrid automatic repeat request transmission on the at least one of the one or more configured sidelink resources. In some examples, the transmitting component 1135 may be configured as or otherwise support a means for transmitting, to the second UE, one or more hybrid automatic repeat request retransmissions based on transmitting a second request to the device, performing the sensing-based channel access procedure, or a combination thereof.

In some examples, the one or more hybrid automatic repeat request transmissions include an initial hybrid automatic repeat request transmission, one or more hybrid automatic repeat request retransmissions, or a combination thereof.

In some examples, the sidelink resource component 1150 may be configured as or otherwise support a means for receiving, from the device, an additional indication of one or more additional configured sidelink resources allocated to one or more additional UEs, the one or more additional configured sidelink resources being allocated to the one or more additional UEs from the pool of sidelink resources configured for the sensing-based channel access procedure.

In some examples, the sidelink resource component 1150 may be configured as or otherwise support a means for transmitting the additional indication of the one or more additional configured sidelink resources via a sidelink broadcast channel message.

In some examples, to support transmitting the additional indication via the sidelink broadcast channel, the sidelink resource component 1150 may be configured as or otherwise support a means for transmitting the additional indication of the one or more additional configured sidelink resources via a sidelink remaining system information message that is frequency division multiplexed with the sidelink broadcast channel message.

In some examples, to support receiving the additional indication of the one or more additional configured sidelink resources, the sidelink resource component 1150 may be configured as or otherwise support a means for receiving the additional indication from the device via a broadcast message.

In some examples, the resource availability component 1155 may be configured as or otherwise support a means for transmitting, on a first configured sidelink resource of the one or more configured sidelink resources allocated to the first UE, an additional indication corresponding to one or more subsequent configured sidelink resources of the one or more configured sidelink resources after the first configured sidelink resource, where the one or more subsequent configured sidelink resources are available to be used by an additional UE.

In some examples, the additional indication corresponding to the one or more subsequent configured sidelink resources includes a single subsequent configured sidelink resource, a set of subsequent configured sidelink resources defined by a time-frequency window, a set of subsequent configured sidelink resources with a specified periodicity, or a combination thereof.

In some examples, to support transmitting the sidelink message, the transmitting component 1135 may be configured as or otherwise support a means for transmitting the sidelink message on the at least one of the one or more configured sidelink resources with a non-zero cyclic prefix extension.

In some examples, the one or more configured sidelink resources include sidelink resources with a non-zero cyclic prefix extension, sidelink resources with a zero cyclic prefix extension, sidelink resources indicated by a sidelink broadcast channel, or a combination thereof.

In some examples, the transmitting component 1135 may be configured as or otherwise support a means for transmitting, to the device, one or more periodical reports, where the one or more configured sidelink resources are based on the one or more periodical reports.

In some examples, the release counter component 1160 may be configured as or otherwise support a means for releasing the one or more configured sidelink resources based on a configured release counter.

In some examples, the reception configuration component 1165 may be configured as or otherwise support a means for receiving, from the device, a reception configuration including an additional indication of one or more time instances for operating in a receiving mode for sidelink communications with an additional device.

In some examples, to support transmitting the request to transmit the one or more sidelink messages, the request component 1125 may be configured as or otherwise support a means for transmitting the request including a request for one or more sidelink resources for transmitting the sidelink message.

In some examples, to support transmitting the one or more sidelink message, the transmitting component 1135 may be configured as or otherwise support a means for transmitting the sidelink message on the at least one of the one or more configured sidelink independent of performing the sensing-based channel access procedure.

Additionally or alternatively, the communications manager 1120 may support wireless communications at a device in accordance with examples as disclosed herein. The sidelink message component 1140 may be configured as or otherwise support a means for receiving, from a first UE, a request for the first UE to transmit one or more sidelink messages to a second UE. The indication transmitting component 1145 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

In some examples, to support transmitting the indication of the one or more configured sidelink resources allocated to the first UE, the indication transmitting component 1145 may be configured as or otherwise support a means for transmitting the indication via radio resource control signaling, a downlink control information message, or both.

In some examples, the resource allocation component 1170 may be configured as or otherwise support a means for transmitting, to the first UE, an additional indication of one or more additional configured sidelink resources allocated to one or more additional UEs, the one or more additional configured sidelink resources being allocated to the one or more additional UEs from the pool of sidelink resources configured for the sensing-based channel access procedure.

In some examples, to support transmitting the additional indication of the one or more additional configured sidelink resources, the resource allocation component 1170 may be configured as or otherwise support a means for transmitting the additional indication to a set of multiple UEs via a broadcast message, the set of multiple UEs including the first UE and the second UE.

In some examples, the one or more configured sidelink resources include sidelink resources with a non-zero cyclic prefix extension, sidelink resources with a zero cyclic prefix extension, sidelink resources indicated by a sidelink broadcast channel, or a combination thereof.

In some examples, the sidelink message component 1140 may be configured as or otherwise support a means for receiving, from the first UE, one or more periodical reports, where the one or more configured sidelink resources are based on the one or more periodical reports.

In some examples, the counter indicator 1175 may be configured as or otherwise support a means for transmitting, to the first UE, an additional indication of a release counter, where the first UE releases the one or more configured sidelink resources based on the release counter.

In some examples, the receiving mode indicator 1180 may be configured as or otherwise support a means for transmitting, to the first UE or the second UE or both, a reception configuration including an additional indication of one or more time instances for operating in a receiving mode for sidelink communications with an additional device.

In some examples, to support receiving the request for the first UE to transmit the one or more sidelink messages, the sidelink message component 1140 may be configured as or otherwise support a means for receiving the request including a request for one or more sidelink resources for transmitting the sidelink message.

Figure 12:
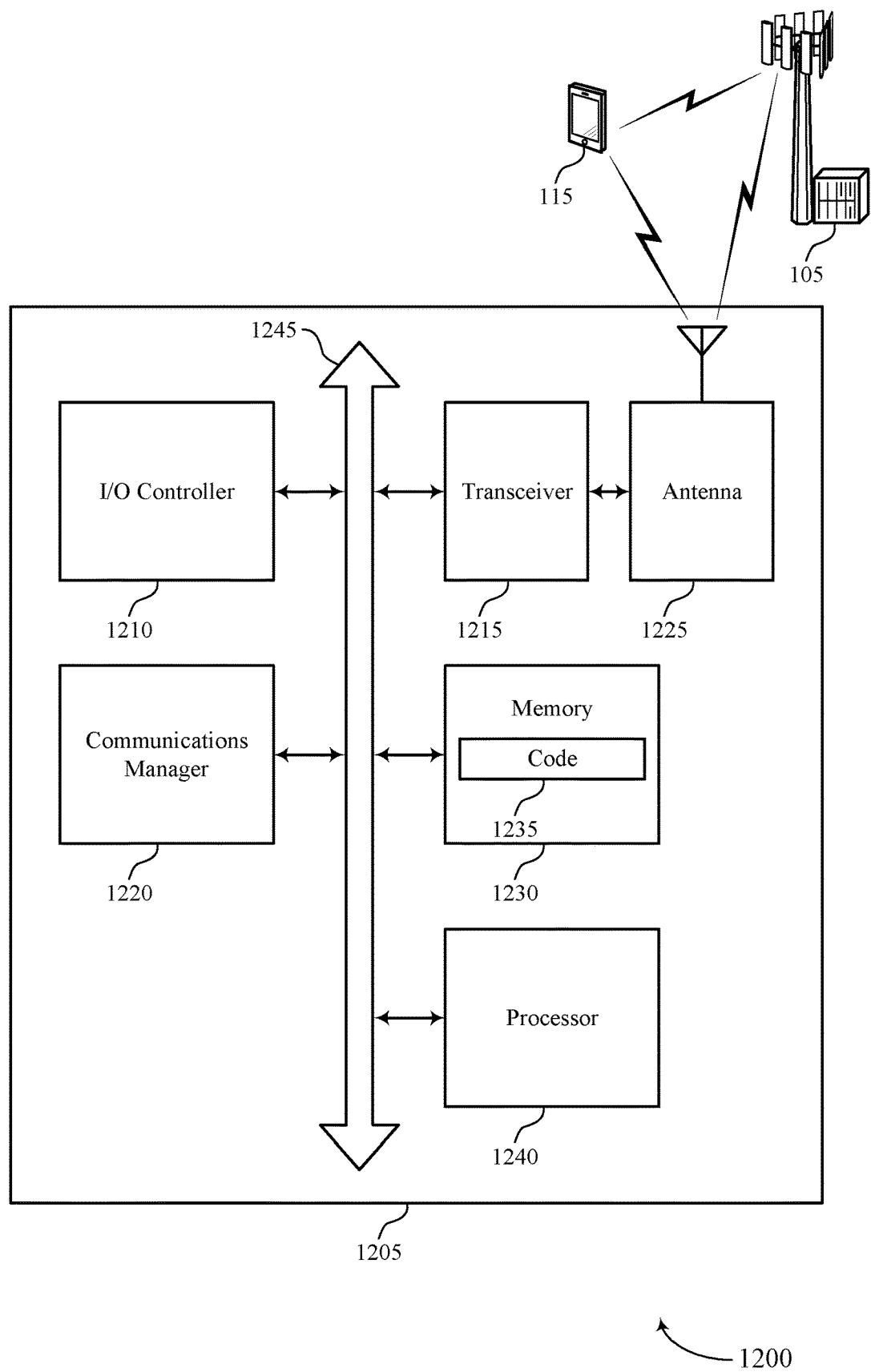
FIG. 12 shows a diagram of a system including a device that supports techniques for configuring resources in a sidelink resource pool in accordance with various aspects of the present disclosure.

FIG. 12 shows a diagram of a system 1200 including a device 1205 that supports techniques for configuring resources in a sidelink resource pool in accordance with various aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for configuring resources in a sidelink resource pool). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a first UE in accordance with examples as disclosed herein. For example, the communications manager 1220 may be configured as or otherwise support a means for transmitting, to a device, a request to transmit one or more sidelink messages to a second UE. The communications manager 1220 may be configured as or otherwise support a means for receiving, from the device and based on the transmitted request, an indication of one or more configured sidelink resources allocated to the first UE, the one or more configured sidelink resources being allocated to the first UE from a pool of sidelink resources configured for a sensing-based channel access procedure. The communications manager 1220 may be configured as or otherwise support a means for transmitting, to the second UE on at least one of the one or more configured sidelink resources, the sidelink message based on the received indication.

Additionally or alternatively, the communications manager 1220 may support wireless communications at a device in accordance with examples as disclosed herein. For example, the communications manager 1220 may be configured as or otherwise support a means for receiving, from a first UE, a request for the first UE to transmit one or more sidelink messages to a second UE. The communications manager 1220 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

By including or configuring the communications manager 1220 in accordance with examples as described herein, the device 1205 may support techniques for improving spectral efficiency and increasing overall power efficiency by assigning individual resources of a resource pool configured for the second channel access mode to specific UEs in a sidelink cluster. Further, configuring a UE to operate according to an enhanced version of the second channel access mode may result in improved data throughput, decreased delays, and improved user experience. In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for configuring resources in a sidelink resource pool as described herein, or the processor 1240 and the memory 1230 may be otherwise configured to perform or support such operations.

Figure 13:
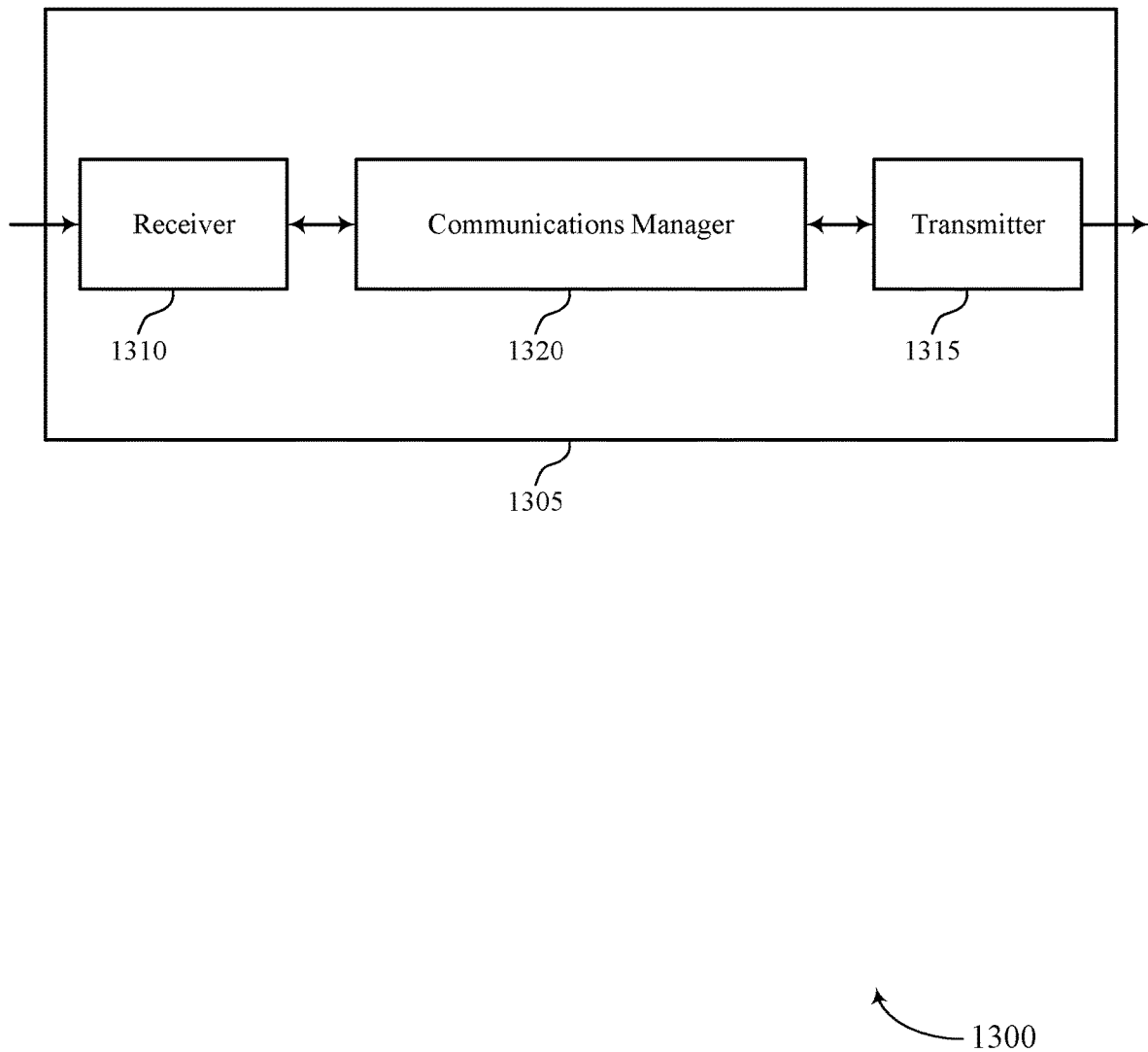
FIGS. 13 and 14 show block diagrams of devices that support techniques for configuring resources in a sidelink resource pool in accordance with various aspects of the present disclosure.

FIG. 13 shows a block diagram 1300 of a device 1305 that supports techniques for configuring resources in a sidelink resource pool in accordance with various aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for configuring resources in a sidelink resource pool). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for configuring resources in a sidelink resource pool). In some examples, the transmitter 1315 may be co-located with a receiver 1310 in a transceiver component. The transmitter 1315 may utilize a single antenna or a set of multiple antennas.

The communications manager 1320, the receiver 1310, the transmitter 1315, or various combinations thereof or various components thereof may be examples of means for performing various aspects of techniques for configuring resources in a sidelink resource pool as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a device in accordance with examples as disclosed herein. For example, the communications manager 1320 may be configured as or otherwise support a means for receiving, from a first UE, a request for the first UE to transmit one or more sidelink messages to a second UE. The communications manager 1320 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for improving spectral efficiency and increasing overall power efficiency by assigning individual resources of a resource pool configured for the second channel access mode to specific UEs in a sidelink cluster. Further, configuring a UE to operate according to an enhanced version of the second channel access mode may result in improved data throughput, decreased delays, and improved user experience.

Figure 14:
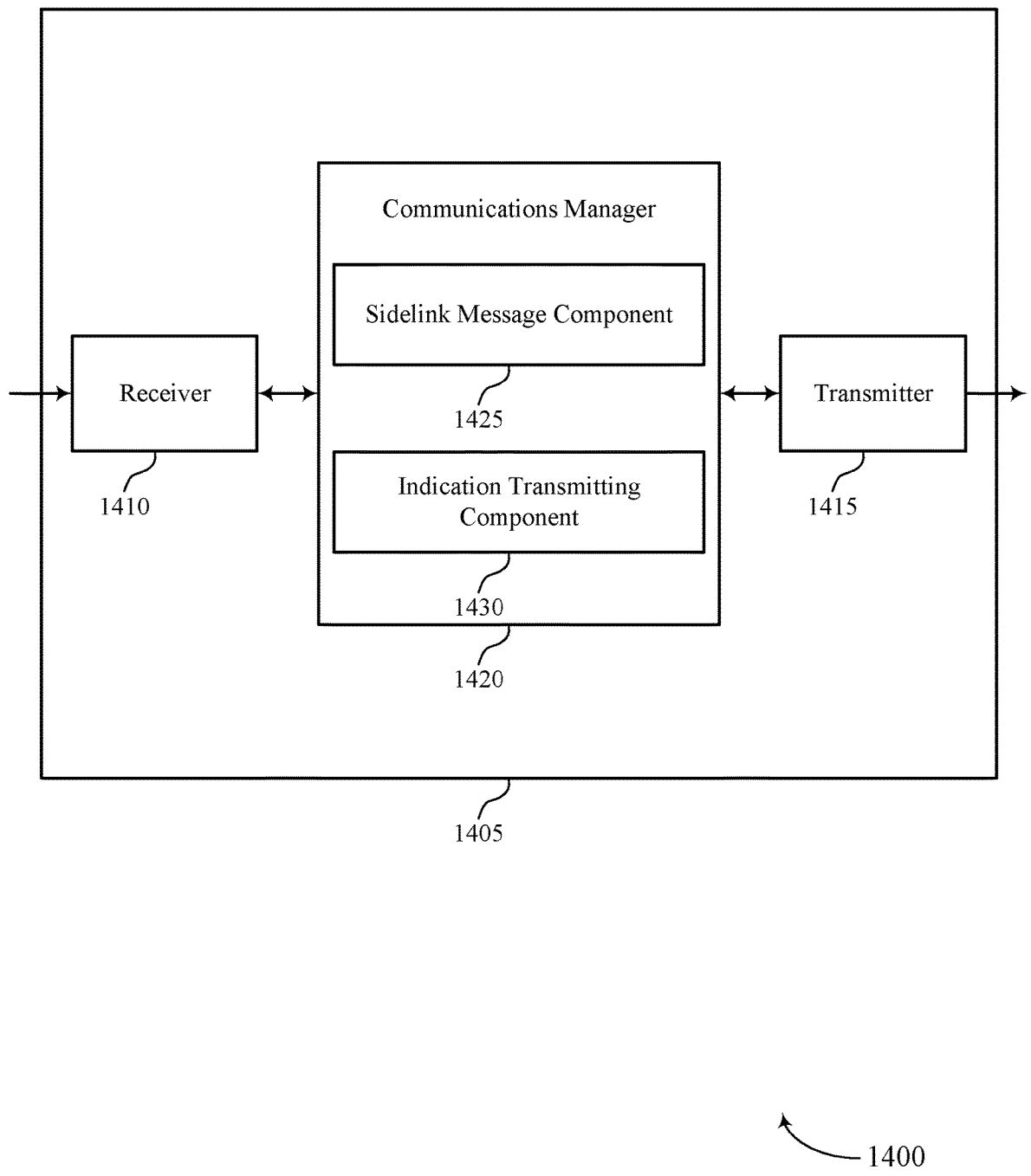

FIG. 14 shows a block diagram 1400 of a device 1405 that supports techniques for configuring resources in a sidelink resource pool in accordance with various aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for configuring resources in a sidelink resource pool). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for configuring resources in a sidelink resource pool). In some examples, the transmitter 1415 may be co-located with a receiver 1410 in a transceiver component. The transmitter 1415 may utilize a single antenna or a set of multiple antennas.

The device 1405, or various components thereof, may be an example of means for performing various aspects of techniques for configuring resources in a sidelink resource pool as described herein. For example, the communications manager 1420 may include a sidelink message component 1425 an indication transmitting component 1430, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a device in accordance with examples as disclosed herein. The sidelink message component 1425 may be configured as or otherwise support a means for receiving, from a first UE, a request for the first UE to transmit one or more sidelink messages to a second UE. The indication transmitting component 1430 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

Figure 15:
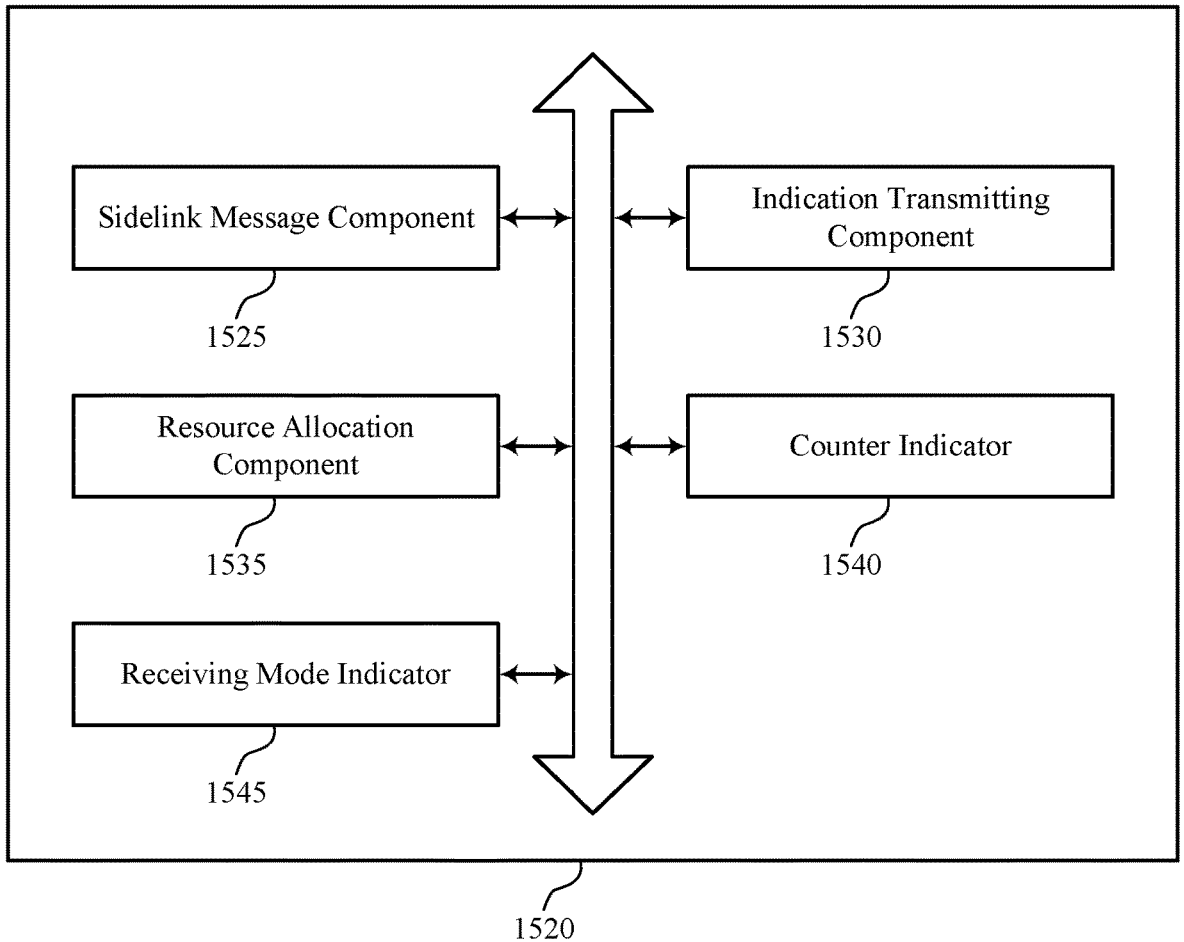
FIG. 15 shows a block diagram of a communications manager that supports techniques for configuring resources in a sidelink resource pool in accordance with various aspects of the present disclosure.

FIG. 15 shows a block diagram 1500 of a communications manager 1520 that supports techniques for configuring resources in a sidelink resource pool in accordance with various aspects of the present disclosure. The communications manager 1520 may be an example of aspects of a communications manager 1320, a communications manager 1420, or both, as described herein. The communications manager 1520, or various components thereof, may be an example of means for performing various aspects of techniques for configuring resources in a sidelink resource pool as described herein. For example, the communications manager 1520 may include a sidelink message component 1525, an indication transmitting component 1530, a resource allocation component 1535, a counter indicator 1540, a receiving mode indicator 1545, or any combination thereof. Each of these components may communicate, directly or indirectly, with one another (e.g., via one or more buses).

The communications manager 1520 may support wireless communications at a device in accordance with examples as disclosed herein. The sidelink message component 1525 may be configured as or otherwise support a means for receiving, from a first UE, a request for the first UE to transmit one or more sidelink messages to a second UE. The indication transmitting component 1530 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

In some examples, to support transmitting the indication of the one or more configured sidelink resources allocated to the first UE, the indication transmitting component 1530 may be configured as or otherwise support a means for transmitting the indication via radio resource control signaling, a downlink control information message, or both.

In some examples, the resource allocation component 1535 may be configured as or otherwise support a means for transmitting, to the first UE, an additional indication of one or more additional configured sidelink resources allocated to one or more additional UEs, the one or more additional configured sidelink resources being allocated to the one or more additional UEs from the pool of sidelink resources configured for the sensing-based channel access procedure.

In some examples, to support transmitting the additional indication of the one or more additional configured sidelink resources, the resource allocation component 1535 may be configured as or otherwise support a means for transmitting the additional indication to a set of multiple UEs via a broadcast message, the set of multiple UEs including the first UE and the second UE.

In some examples, the one or more configured sidelink resources include sidelink resources with a non-zero cyclic prefix extension, sidelink resources with a zero cyclic prefix extension, sidelink resources indicated by a sidelink broadcast channel, or a combination thereof.

In some examples, the sidelink message component 1525 may be configured as or otherwise support a means for receiving, from the first UE, one or more periodical reports, where the one or more configured sidelink resources are based on the one or more periodical reports.

In some examples, the counter indicator 1540 may be configured as or otherwise support a means for transmitting, to the first UE, an additional indication of a release counter, where the first UE releases the one or more configured sidelink resources based on the release counter.

In some examples, the receiving mode indicator 1545 may be configured as or otherwise support a means for transmitting, to the first UE or the second UE or both, a reception configuration including an additional indication of one or more time instances for operating in a receiving mode for sidelink communications with an additional device.

In some examples, to support receiving the request for the first UE to transmit the one or more sidelink messages, the sidelink message component 1525 may be configured as or otherwise support a means for receiving the request including a request for one or more sidelink resources for transmitting the sidelink message.

Figure 16:
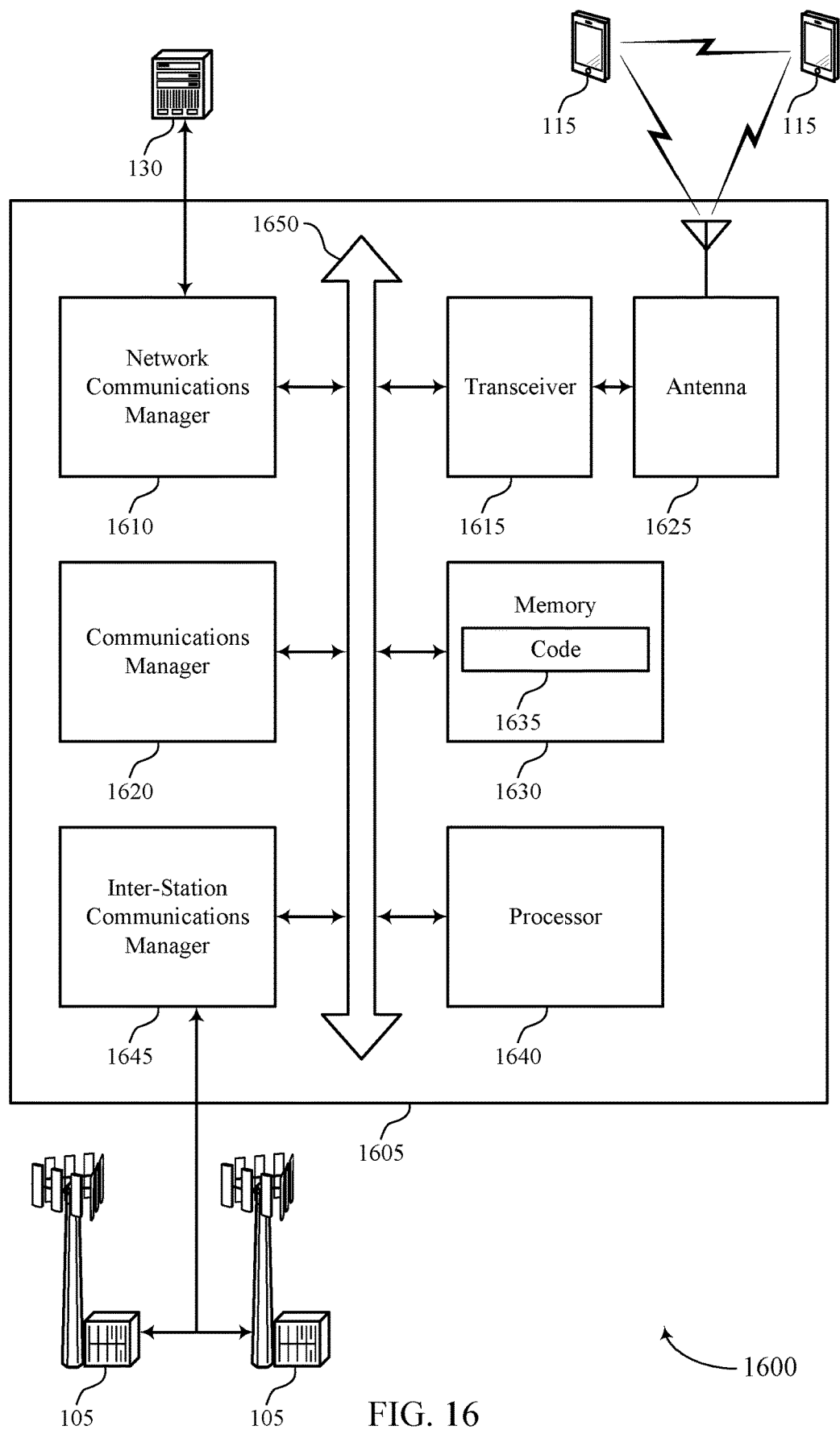
FIG. 16 shows a diagram of a system including a device that supports techniques for configuring resources in a sidelink resource pool in accordance with various aspects of the present disclosure.

FIG. 16 shows a diagram of a system 1600 including a device 1605 that supports techniques for configuring resources in a sidelink resource pool in accordance with various aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for configuring resources in a sidelink resource pool). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a device in accordance with examples as disclosed herein. For example, the communications manager 1620 may be configured as or otherwise support a means for receiving, from a first UE, a request for the first UE to transmit one or more sidelink messages to a second UE. The communications manager 1620 may be configured as or otherwise support a means for transmitting, to the first UE and based on the received request, an indication of one or more configured sidelink resources allocated to the first UE, the one or more configured sidelink resources being allocated to the first UE from a pool of sidelink resources configured for a sensing-based channel access procedure.

By including or configuring the communications manager 1620 in accordance with examples as described herein, the device 1605 may support techniques for improving spectral efficiency and increasing overall power efficiency by assigning individual resources of a resource pool configured for the second channel access mode to specific UEs in a sidelink cluster. Further, configuring a UE to operate according to an enhanced version of the second channel access mode may result in improved data throughput, decreased delays, and improved user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for configuring resources in a sidelink resource pool as described herein, or the processor 1640 and the memory 1630 may be otherwise configured to perform or support such operations.

Figure 17:
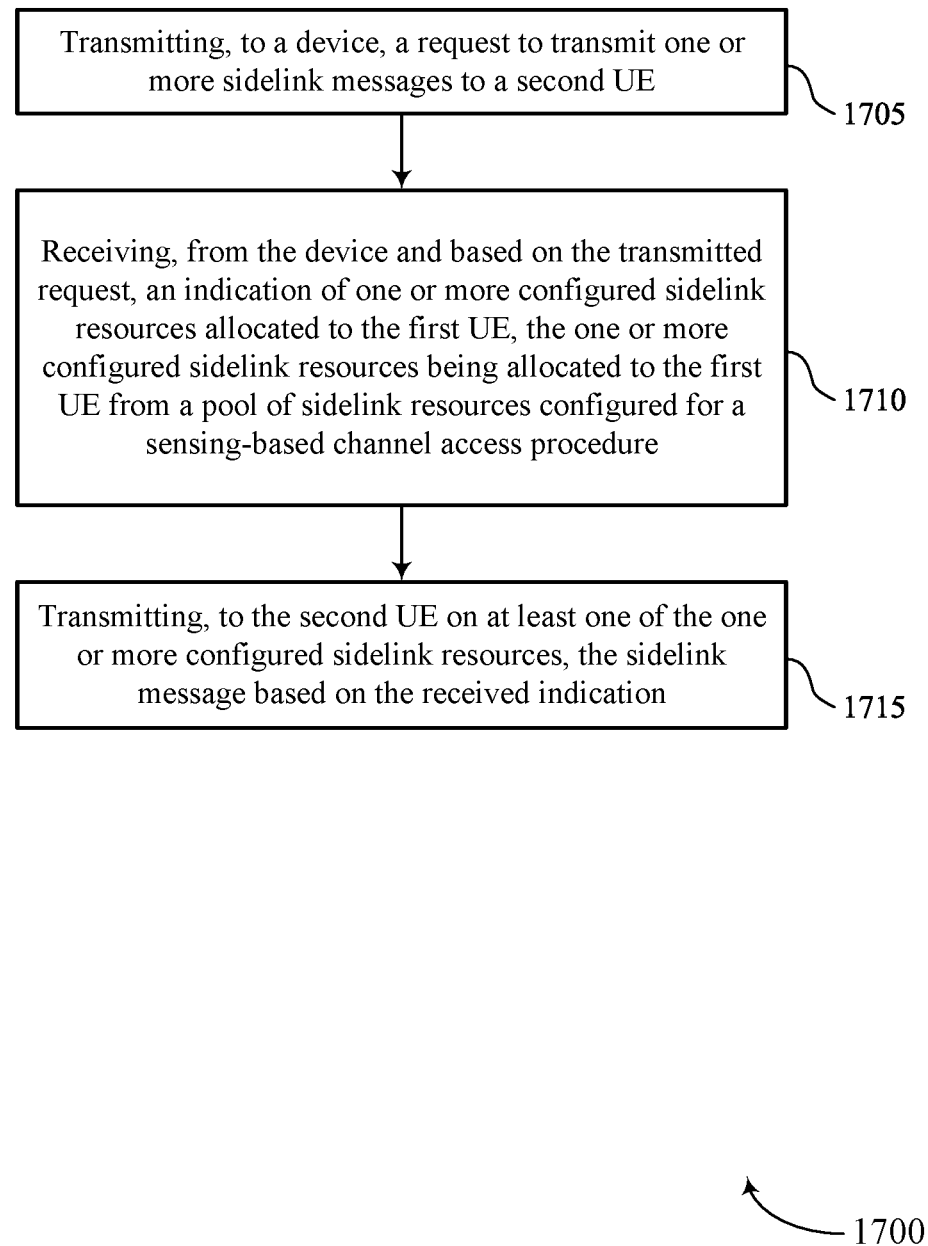
FIGS. 17 and 18 show flowcharts illustrating methods that support techniques for configuring resources in a sidelink resource pool in accordance with various aspects of the present disclosure.

FIG. 17 shows a flowchart illustrating a method 1700 that supports techniques for configuring resources in a sidelink resource pool in accordance with various aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include transmitting, to a device, a request to transmit one or more sidelink messages to a second UE. The operations of 1705 may be performed in accordance with examples as disclosed herein. In some examples, aspects of the operations of 1705 may be performed by a request component 1125 as described with reference to FIG. 11.

At 1710, the method may include receiving, from the device and based on the transmitted request, an indication of one or more configured sidelink resources allocated to the first UE, the one or more configured sidelink resources being allocated to the first UE from a pool of sidelink resources configured for a sensing-based channel access procedure. The operations of 1710 may be performed in accordance with examples as disclosed herein. In some examples, aspects of the operations of 1710 may be performed by an indication receiving component 1130 as described with reference to FIG. 11.

At 1715, the method may include transmitting, to the second UE on at least one of the one or more configured sidelink resources, the sidelink message based on the received indication. The operations of 1715 may be performed in accordance with examples as disclosed herein. In some examples, aspects of the operations of 1715 may be performed by a transmitting component 1135 as described with reference to FIG. 11.

Figure 18:
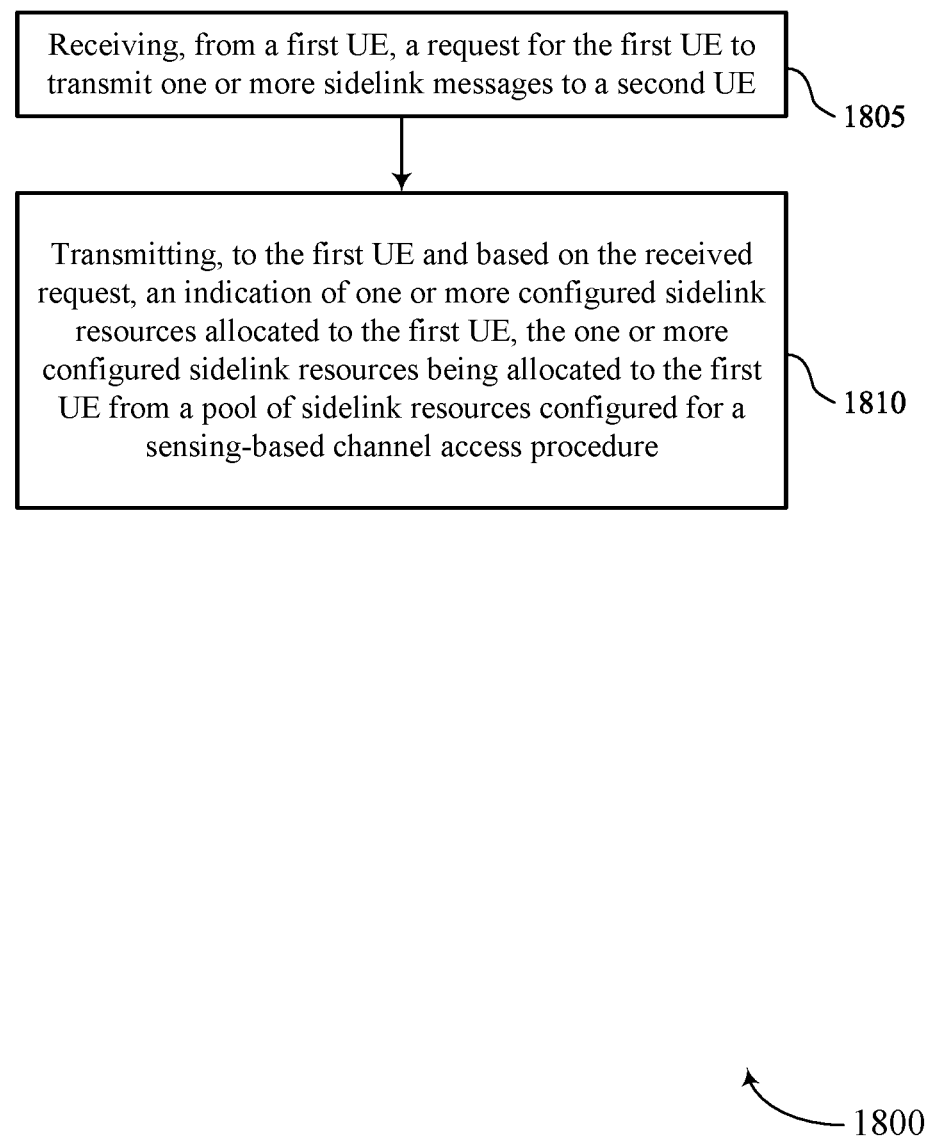

FIG. 18 shows a flowchart illustrating a method 1800 that supports techniques for configuring resources in a sidelink resource pool in accordance with various aspects of the present disclosure. The operations of the method 1800 may be implemented by a UE or a base station or its components as described herein. For example, the operations of the method 1800 may be performed by a UE 115 as described with reference to FIGS. 1 through 12 or a base station 105 as described with reference to FIGS. 1 through 8 and 13 through 16. In some examples, a UE or a base station may execute a set of instructions to control the functional elements of the UE or the base station to perform the described functions. Additionally or alternatively, the UE or the base station may perform aspects of the described functions using special-purpose hardware.

At 1805, the method may include receiving, from a first UE, a request for the first UE to transmit one or more sidelink messages to a second UE. The operations of 1805 may be performed in accordance with examples as disclosed herein. In some examples, aspects of the operations of 1805 may be performed by a sidelink message component 1140 or a sidelink message component 1525 as described with reference to FIGS. 11 and 15.

At 1810, the method may include transmitting, to the first UE and based on the received request, an indication of one or more configured sidelink resources allocated to the first UE, the one or more configured sidelink resources being allocated to the first UE from a pool of sidelink resources configured for a sensing-based channel access procedure. The operations of 1810 may be performed in accordance with examples as disclosed herein. In some examples, aspects of the operations of 1810 may be performed by an indication transmitting component 1145 or an indication transmitting component 1530 as described with reference to FIGS. 11 and 15.

The following provides an overview of aspects of the present disclosure:

Aspect 1: A method for wireless communications at a first UE, comprising: transmitting, to a device, a request to transmit one or more sidelink messages to a second UE; receiving, from the device and based at least in part on the transmitted request, an indication of one or more configured sidelink resources allocated to the first UE, the one or more configured sidelink resources being allocated to the first UE from a pool of sidelink resources configured for a sensing-based channel access procedure; and transmitting, to the second UE on at least one of the one or more configured sidelink resources, the sidelink message based at least in part on the received indication.

Aspect 2: The method of aspect 1, wherein receiving the indication of the one or more configured sidelink resources allocated to the first UE comprises: receiving the indication via radio resource control signaling, a downlink control information message, or both.

Aspect 3: The method of any of aspects 1 through 2, wherein transmitting the sidelink message comprises: transmitting, to the second UE, one or more hybrid automatic repeat request transmissions on the at least one of the one or more configured sidelink resources.

Aspect 4: The method of aspect 3, further comprising: transmitting, to the second UE, an initial hybrid automatic repeat request transmission on the at least one of the one or more configured sidelink resources; and transmitting, to the second UE, one or more hybrid automatic repeat request retransmissions based at least in part on transmitting a second request to the base station, performing the sensing-based channel access procedure, or a combination thereof.

Aspect 5: The method of any of aspects 3 through 4, wherein the one or more hybrid automatic repeat request transmissions comprise an initial hybrid automatic repeat request transmission, one or more hybrid automatic repeat request retransmissions, or a combination thereof.

Aspect 6: The method of any of aspects 1 through 5, further comprising: receiving, from the device, an additional indication of one or more additional configured sidelink resources allocated to one or more additional UEs, the one or more additional configured sidelink resources being allocated to the one or more additional UEs from the pool of sidelink resources configured for the sensing-based channel access procedure.

Aspect 7: The method of aspect 6, further comprising: transmitting the additional indication of the one or more additional configured sidelink resources via a sidelink broadcast channel message.

Aspect 8: The method of aspect 7, wherein transmitting the additional indication via the sidelink broadcast channel message comprises: transmitting the additional indication of the one or more additional configured sidelink resources via a sidelink remaining system information message that is frequency division multiplexed with the sidelink broadcast channel message.

Aspect 9: The method of any of aspects 6 through 8, wherein receiving the additional indication of the one or more additional configured sidelink resources comprises: receiving the additional indication from the base station via a broadcast message.

Aspect 10: The method of any of aspects 1 through 9, further comprising: transmitting, on a first configured sidelink resource of the one or more configured sidelink resources allocated to the first UE, an additional indication corresponding to one or more subsequent configured sidelink resources of the one or more configured sidelink resources after the first configured sidelink resource, wherein the one or more subsequent configured sidelink resources are available to be used by an additional UE.

Aspect 11: The method of aspect 10, wherein the additional indication corresponding to the one or more subsequent configured sidelink resources comprises a single subsequent configured sidelink resource, a set of subsequent configured sidelink resources defined by a time-frequency window, a set of subsequent configured sidelink resources with a specified periodicity, or a combination thereof.

Aspect 12: The method of any of aspects 1 through 11, wherein transmitting the sidelink message comprises: transmitting the sidelink message on the at least one of the one or more configured sidelink resources with a non-zero cyclic prefix extension.

Aspect 13: The method of any of aspects 1 through 12, wherein the one or more configured sidelink resources comprise sidelink resources with a non-zero cyclic prefix extension, sidelink resources with a zero cyclic prefix extension, sidelink resources indicated by a sidelink broadcast channel, or a combination thereof.

Aspect 14: The method of any of aspects 1 through 13, further comprising: transmitting, to the device, one or more periodical reports, wherein the one or more configured sidelink resources are based at least in part on the one or more periodical reports.

Aspect 15: The method of any of aspects 1 through 14, further comprising: releasing the one or more configured sidelink resources based at least in part on a configured release counter.

Aspect 16: The method of any of aspects 1 through 15, further comprising: receiving, from the device, a reception configuration comprising an additional indication of one or more time instances for operating in a receiving mode for sidelink communications with an additional device.

Aspect 17: The method of any of aspects 1 through 16, wherein transmitting the request to transmit the one or more sidelink messages further comprises: transmitting the request comprising a request for one or more sidelink resources for transmitting the sidelink message.

Aspect 18: The method of any of aspects 1 through 17, wherein transmitting the one or more sidelink message comprises: transmitting the sidelink message on the at least one of the one or more configured sidelink independent of performing the sensing-based channel access procedure.

Aspect 19: A method for wireless communications at a device, comprising: receiving, from a first UE, a request for the first UE to transmit one or more sidelink messages to a second UE; and transmitting, to the first UE and based at least in part on the received request, an indication of one or more configured sidelink resources allocated to the first UE, the one or more configured sidelink resources being allocated to the first UE from a pool of sidelink resources configured for a sensing-based channel access procedure.

Aspect 20: The method of aspect 19, wherein transmitting the indication of the one or more configured sidelink resources allocated to the first UE comprises: transmitting the indication via radio resource control signaling, a downlink control information message, or both.

Aspect 21: The method of any of aspects 19 through 20, further comprising: transmitting, to the first UE, an additional indication of one or more additional configured sidelink resources allocated to one or more additional UEs, the one or more additional configured sidelink resources being allocated to the one or more additional UEs from the pool of sidelink resources configured for the sensing-based channel access procedure.

Aspect 22: The method of aspect 21, wherein transmitting the additional indication of the one or more additional configured sidelink resources comprises: transmitting the additional indication to a plurality of UEs via a broadcast message, the plurality of UEs comprising the first UE and the second UE.

Aspect 23: The method of any of aspects 19 through 22, wherein the one or more configured sidelink resources comprise sidelink resources with a non-zero cyclic prefix extension, sidelink resources with a zero cyclic prefix extension, sidelink resources indicated by a sidelink broadcast channel, or a combination thereof.

Aspect 24: The method of any of aspects 19 through 23, further comprising: receiving, from the first UE, one or more periodical reports, wherein the one or more configured sidelink resources are based at least in part on the one or more periodical reports.

Aspect 25: The method of any of aspects 19 through 24, further comprising: transmitting, to the first UE, an additional indication of a release counter, wherein the first UE releases the one or more configured sidelink resources based at least in part on the release counter.

Aspect 26: The method of any of aspects 19 through 25, further comprising: transmitting, to the first UE or the second UE or both, a reception configuration comprising an additional indication of one or more time instances for operating in a receiving mode for sidelink communications with an additional device.

Aspect 27: The method of any of aspects 19 through 26, wherein receiving the request for the first UE to transmit the one or more sidelink messages further comprises: receiving the request comprising a request for one or more sidelink resources for transmitting the sidelink message.

Aspect 28: An apparatus for wireless communications at a first UE, comprising a processor; memory coupled with the processor; and instructions stored in the memory and executable by the processor to cause the apparatus to perform a method of any of aspects 1 through 18.

Aspect 29: An apparatus for wireless communications at a first UE, comprising at least one means for performing a method of any of aspects 1 through 18.

Aspect 30: A non-transitory computer-readable medium storing code for wireless communications at a first UE, the code comprising instructions executable by a processor to perform a method of any of aspects 1 through 18.

Aspect 31: An apparatus for wireless communications at a device, comprising a processor; memory coupled with the processor; and instructions stored in the memory and executable by the processor to cause the apparatus to perform a method of any of aspects 19 through 27.

Aspect 32: An apparatus for wireless communications at a device, comprising at least one means for performing a method of any of aspects 19 through 27.

Aspect 33: A non-transitory computer-readable medium storing code for wireless communications at a device, the code comprising instructions executable by a processor to perform a method of any of aspects 19 through 27.

It should be noted that the techniques described herein describe possible implementations, and that the operations and the steps may be rearranged or otherwise modified and that other implementations are possible. Further, aspects from two or more of the techniques may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    transmitting, to a device, a request to transmit one or more sidelink messages to a second UE;
    receiving, from the device and based at least in part on the transmitted request, a first indication of one or more first configured sidelink resources allocated to the first UE, the one or more first configured sidelink resources being allocated to the first UE by the device from a pool of sidelink resources configured for a sensing-based channel access procedure that is available for a plurality of UEs;
    receiving, from the device, a reception configuration including a second indication of one or more time instances for operating in a receiving mode for sidelink communications with a second device; and
    transmitting, to the second UE on at least one of the one or more first configured sidelink resources, the sidelink message based at least in part on the received first indication.

2. The method of claim 1, wherein receiving the first indication of the one or more first configured sidelink resources allocated to the first UE comprises:
    receiving the first indication via radio resource control signaling, a downlink control information message, or both.

3. The method of claim 1, wherein transmitting the sidelink message comprises:
    transmitting, to the second UE, one or more hybrid automatic repeat request transmissions on the at least one of the one or more first configured sidelink resources.

4. The method of claim 3, further comprising:
    transmitting, to the second UE, an initial hybrid automatic repeat request transmission on the at least one of the one or more first configured sidelink resources; and
    transmitting, to the second UE, one or more hybrid automatic repeat request retransmissions based at least in part on transmitting a second request to the device, performing the sensing-based channel access procedure, or a combination thereof.

5. The method of claim 3, wherein the one or more hybrid automatic repeat request transmissions comprise an initial hybrid automatic repeat request transmission, one or more hybrid automatic repeat request retransmissions, or a combination thereof.

6. The method of claim 1, further comprising:
receiving, from the device, a third indication of one or more second configured sidelink resources allocated to one or more third UEs, the one or more second configured sidelink resources being allocated to the one or more third UEs from the pool of sidelink resources configured for the sensing-based channel access procedure.

7. The method of claim 6, further comprising:
transmitting the third indication of the one or more second configured sidelink resources via a sidelink broadcast channel message.

8. The method of claim 7, wherein transmitting the third indication via the sidelink broadcast channel comprises:
transmitting the third indication of the one or more second configured sidelink resources via a sidelink remaining system information message that is frequency division multiplexed with the sidelink broadcast channel message.

9. The method of claim 6, wherein receiving the third indication of the one or more second configured sidelink resources comprises:
receiving the third indication from the device via a broadcast message.

10. The method of claim 1, further comprising:
transmitting, on a first configured sidelink resource of the one or more first configured sidelink resources allocated to the first UE, a third indication corresponding to one or more subsequent configured sidelink resources of the one or more first configured sidelink resources after the first configured sidelink resource, wherein the one or more subsequent configured sidelink resources are available to be used by an additional UE.

11. The method of claim 10, wherein the third indication corresponding to the one or more subsequent configured sidelink resources comprises a single subsequent configured sidelink resource, a set of subsequent configured sidelink resources defined by a time-frequency window, a set of subsequent configured sidelink resources with a specified periodicity, or a combination thereof.

12. The method of claim 1, wherein transmitting the sidelink message comprises:
transmitting the sidelink message on the at least one of the one or more first configured sidelink resources with a non-zero cyclic prefix extension.

13. The method of claim 1, wherein the one or more first configured sidelink resources comprise sidelink resources with a non-zero cyclic prefix extension, sidelink resources with a zero cyclic prefix extension, sidelink resources indicated by a sidelink broadcast channel, or a combination thereof.

14. The method of claim 1, further comprising:
transmitting, to the device, one or more periodical reports, wherein the one or more first configured sidelink resources are based at least in part on the one or more periodical reports.

15. The method of claim 1, further comprising:
releasing the one or more first configured sidelink resources based at least in part on a configured release counter.

16. The method of claim 1, wherein transmitting the request to transmit the one or more sidelink messages further comprises:
transmitting the request comprising a request for one or more sidelink resources for transmitting the sidelink message.

17. The method of claim 1, wherein transmitting the one or more sidelink message comprises:
transmitting the sidelink message on the at least one of the one or more first configured sidelink independent of performing the sensing-based channel access procedure.

18. A method for wireless communications at a device, comprising:
receiving, from a first user equipment (UE), a request for the first UE to transmit one or more sidelink messages to a second UE;
transmitting, to the first UE and based at least in part on the received request, a first indication of one or more first configured sidelink resources allocated to the first UE, the one or more configured sidelink resources being allocated to the first UE from a pool of sidelink resources configured for a sensing-based channel access procedure that is available for a plurality of UEs; and
transmitting, to the first UE or the second UE or both, a reception configuration including a second indication of one or more time instances for operating in a receiving mode for sidelink communications with a second device.

19. The method of claim 18, wherein transmitting the first indication of the one or more first configured sidelink resources allocated to the first UE comprises:
transmitting the first indication via radio resource control signaling, a downlink control information message, or both.

20. The method of claim 18, further comprising:
transmitting, to the first UE, a third indication of one or more second configured sidelink resources allocated to one or more second UEs, the one or more second configured sidelink resources being allocated to the one or more second UEs from the pool of sidelink resources configured for the sensing-based channel access procedure.

21. The method of claim 20, wherein transmitting the third indication of the one or more second configured sidelink resources comprises:
transmitting the third indication to a plurality of UEs via a broadcast message, the plurality of UEs comprising the first UE and the second UE.

22. The method of claim 18, wherein the one or more first configured sidelink resources comprise sidelink resources with a non-zero cyclic prefix extension, sidelink resources with a zero cyclic prefix extension, sidelink resources indicated by a sidelink broadcast channel, or a combination thereof.

23. The method of claim 18, further comprising:
receiving, from the first UE, one or more periodical reports, wherein the one or more first configured sidelink resources are based at least in part on the one or more periodical reports.

24. The method of claim 18, further comprising:
transmitting, to the first UE, a third indication of a release counter, wherein the first UE releases the one or more first configured sidelink resources based at least in part on the release counter.

25. The method of claim 18, wherein receiving the request for the first UE to transmit the one or more sidelink messages further comprises:
  receiving the request comprising a request for one or more sidelink resources for transmitting the sidelink message.

26. An apparatus for wireless communications at a first user equipment (UE), comprising:
  a processor;
  memory coupled with the processor; and
  instructions stored in the memory and executable by the processor to cause the apparatus to:
    transmit, to a device, a request to transmit one or more sidelink messages to a second UE;
    receive, from the device and based at least in part on the transmitted request, a first indication of one or more first configured sidelink resources allocated to the first UE, the one or more first configured sidelink resources being allocated to the first UE by the device from a pool of sidelink resources configured for a sensing-based channel access procedure that is available for a plurality of UEs;
    receive, from the device, a reception configuration including a second indication of one or more time instances for operating in a receiving mode for sidelink communications with a second device; and
    transmit, to the second UE on at least one of the one or more first configured sidelink resources, the sidelink message based at least in part on the received first indication.

27. The apparatus of claim 26, wherein the instructions to receive the first indication of the one or more first configured sidelink resources allocated to the first UE are executable by the processor to cause the apparatus to:
  receive the first indication via radio resource control signaling, a downlink control information message, or both.

28. An apparatus for wireless communications at a device, comprising:
  a processor;
  memory coupled with the processor; and
  instructions stored in the memory and executable by the processor to cause the apparatus to:
    receive, from a first user equipment (UE), a request for the first UE to transmit one or more sidelink messages to a second UE; and
    transmit, to the first UE and based at least in part on the received request, a first indication of one or more first configured sidelink resources allocated to the first UE, the one or more first configured sidelink resources being allocated to the first UE from a pool of sidelink resources configured for a sensing-based channel access procedure that is available for a plurality of UEs; and
    transmit, to the first UE or the second UE or both, a reception configuration including a second indication of one or more time instances for operating in a receiving mode for sidelink communications with a second device.

\* \* \* \* \*